US011577147B1

(12) United States Patent
Kaniyala et al.

(10) Patent No.: US 11,577,147 B1
(45) Date of Patent: Feb. 14, 2023

(54) DETECTION OF INTENTIONAL CONTACT BETWEEN OBJECT AND BODY PART OF PLAYER IN SPORT

(71) Applicant: SONY GROUP CORPORATION, Tokyo (JP)

(72) Inventors: Ashwal Bhat Kaniyala, Bangalore (IN); Vijayalakshmi Padmanaban, Bangalore (IN); Dayananda Prabhakara, Bangalore (IN); Sumana Hulikal Venkata Rao, Bangalore (IN)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/390,632

(22) Filed: Jul. 30, 2021

(51) Int. Cl.
*A63B 71/06* (2006.01)
*A63B 24/00* (2006.01)

(52) U.S. Cl.
CPC ...... *A63B 71/0605* (2013.01); *A63B 24/0021* (2013.01); *A63B 2024/0025* (2013.01); *A63B 2220/05* (2013.01); *A63B 2220/13* (2013.01); *A63B 2220/30* (2013.01); *A63B 2220/806* (2013.01)

(58) Field of Classification Search
CPC ............ A63B 71/0605; A63B 24/0021; A63B 2024/0025; A63B 2220/05; A63B 2220/13; A63B 2220/30; A63B 2220/806
See application file for complete search history.

(56) References Cited

U.S. PATENT DOCUMENTS

| 4,055,168 | A  | * | 10/1977 | Miller ............... | A63B 23/0244 340/407.1 |
|---|---|---|---|---|---|
| 8,300,935 | B2 |   | 10/2012 | Distante et al. | |
| 9,886,624 | B1 | * | 2/2018  | Marty ................. | G06V 20/42 |
| 10,600,334 | B1 | * | 3/2020  | Zhang ............... | A63B 71/0669 |
| 10,748,376 | B2 | * | 8/2020  | Zhang ............... | G06N 20/20 |
| 10,853,658 | B2 |   | 12/2020 | Ranjan et al. | |
| 11,179,600 | B2 | * | 11/2021 | Hiemann ............ | G01S 5/0263 |
| 11,450,010 | B2 | * | 9/2022  | Sung .................. | G06T 7/246 |
| 2003/0095186 | A1 | * | 5/2003 | Aman ............... | A63B 24/0021 348/169 |

(Continued)

FOREIGN PATENT DOCUMENTS

| CN | 1853747 A | 11/2006 |
|---|---|---|
| CN | 110090424 A | 8/2019 |

*Primary Examiner* — Seng H Lim
(74) *Attorney, Agent, or Firm* — Chip Law Group

(57) ABSTRACT

An electronic device and method for detection of intentional contact between an object and a body part of a player are provided. An electronic device receives a plurality of frames of a video from an imaging device. The electronic device tracks a movement of the object and a movement of the body part across the plurality of frames. The electronic device determines, based on the tracked movement, a frame of interest from the plurality of first frames in which degree of overlap between position coordinates of the object and position coordinates of the body part of the player exceeds an overlap threshold. The electronic device detects a contact between the object and the body part of the player based on the frame of interest. The electronic device applies a machine learning model on the frame of interest and the tracked movement to determine whether the contact is intentional.

20 Claims, 19 Drawing Sheets

(56) References Cited

U.S. PATENT DOCUMENTS

| | | | |
|---|---|---|---|
| 2009/0046152 A1* | 2/2009 | Aman | G01S 17/66 |
| | | | 348/157 |
| 2016/0328839 A1* | 11/2016 | Aoki | G06T 7/20 |
| 2019/0261027 A1* | 8/2019 | Hawke | H04N 21/23424 |
| 2020/0134319 A1* | 4/2020 | Ranjan | G06T 7/74 |
| 2022/0276721 A1* | 9/2022 | Huszar | G06T 7/251 |

* cited by examiner

DETECTION OF INTENTIONAL CONTACT BETWEEN OBJECT AND BODY PART OF PLAYER IN SPORT

CROSS-REFERENCE TO RELATED APPLICATIONS/INCORPORATION BY REFERENCE

None.

FIELD

Various embodiments of the disclosure relate to detection of a foul in a sport. More specifically, various embodiments of the disclosure relate to an electronic device and method for detection of intentional contact between an object and a body part of a player in sport using machine learning.

BACKGROUND

Recent advancements in the field of sports officiating technology have led to the development of various platforms and applications for video assistant referee (VAR) for reviewing decision of a foul in a sport (such as soccer). The VAR may be equipped with cameras installed at different positions on the field for acquiring videos of the players from different points of view. The VAR may analyze the videos acquired from the cameras to make or review a decision for different types of foul (such as a handball event) according to the rules of the sport (such as soccer), in order to minimize human errors by on-field referees. For example, the decision may be associated with whether the handball event by a player is intentional or not. However, in some scenarios, the VAR may take a long time to review the videos from multiple camera angles for events that involve rapid movements to make a decision. This delay in the decision may affect the progress of the match and may make players lose focus of the match. In addition, the decision made by the VAR may be still be prone to human error, and the decision may be different from the actual event, which may significantly influence the outcome of the match. Thus, the current process of the VAR may be time consuming and prone to human errors.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for detection of intentional contact between an object and a body part of a player in a sport using machine learning is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
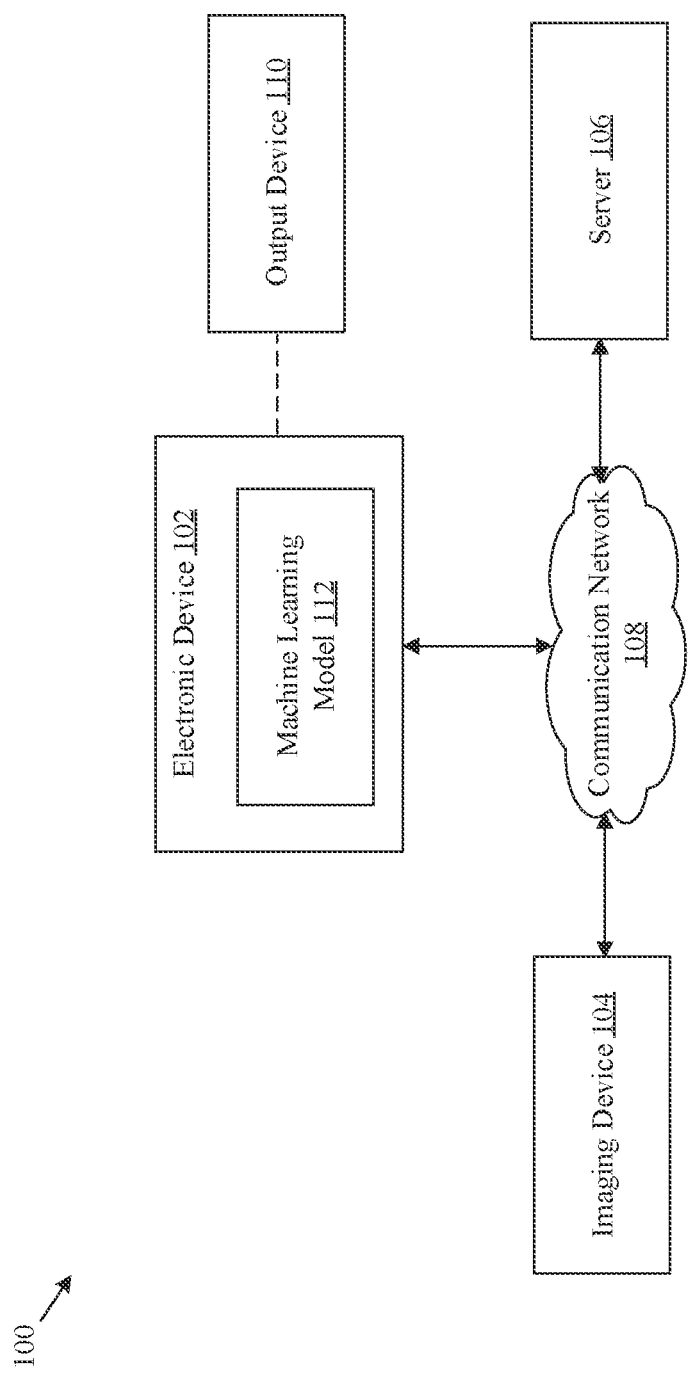
FIG. 1 is a block diagram that illustrates an exemplary network environment for detection of intentional contact between an object and a body part of a first player in a sport using a machine learning model, in accordance with an embodiment of the disclosure.

The following described implementations may be found in the disclosed electronic device and method for detection of intentional contact between an object and a body part of a player in a sport using a machine learning model. The electronic device may receive a plurality of frames of a video from at least one imaging device (such as a video camera). The video may be associated with a field in which a sport (such as soccer or football or any ball sport) is played. The video may comprise a first player of a plurality of players and an object (such as a ball). The electronic device may apply a machine learning model of the plurality of frames to identify the object and a body part (such as a hand) of the first player. The electronic device may track a movement of the object and a movement of the body part of the first player across the plurality of frames. For example, the electronic device may identify the object and the body part of the first player in each frame of the plurality of frames. The electronic device may further track the movement of the object and the movement of the body part of the first player based on the identified object and the identified body part of the first player.

The electronic device may determine, based on the tracked movement, a frame of interest of the plurality of frames in which a degree of overlap between position coordinates of the object and position coordinates of the body part of the first player exceeds an overlap threshold. For example, the electronic device may determine a bounding box of the object based on the position coordinates of the object identified in each frame of the plurality of frames. The electronic device may further determine a bounding box of the body part of the first player based on the position coordinates of the body part of the first player in each frame of the plurality of frames. The electronic device may determine the overlap between the bounding box of the object and the bounding box of the body part of the first player in each frame of the plurality of frames. The electronic device may further select a frame of interest from the plurality of frames in which a degree of overlap between the bounding box of the object and the bounding box of the body part of the first player exceeds the overlap threshold. The electronic device may detect a contact between the object and the body part of the first player based on the determined frame of interest.

The electronic device may further apply the machine learning model on the frame of interest and the tracked movement to determine whether the detected contact is intentional or unintentional. For example, the electronic device may determine a foul (such as a handball event or handling of the ball) based on determination that the detected contact is intentional. The electronic device may apply rules defined by a governing authority of the sport to determine whether the detected contact is intentional or unintentional. Thus, the electronic device may automatically determine whether the contact between the object (such as the ball) and the body part (such as the hand) of the first player is intentional by application of the machine learning model, to thereby eliminate human errors in the decision of the foul and to significantly improve the time required to make the decision. The electronic device may further significantly improve accuracy of the detection of the handball event based on several determining factors (such as a change in trajectory of the object subsequent to the contact, detection of whether the first player fell, source of hit prior to the contact, reaction time available, lower arms raised above shoulder, a point is scored subsequent to the contact, and so on) in compliance with the rules defined by the governing authority of the sport. The electronic device may further assist a referee to determine whether the contact is intentional based on a notification of the intentional contact with proper reasoning to the referee, to thereby expedite the process of the decision of the foul (such as the handball event) by the referee.

FIG. 1 is a block diagram that illustrates an exemplary network environment for detection of intentional contact between an object and a body part of a first player in a sport using a machine learning model, in accordance with an embodiment of the disclosure. With reference to FIG. 1, there is shown a network environment 100. In the network environment 100, there is shown an electronic device 102, an imaging device 104, a server 106, and an output device 110. In the network environment 100, there is further shown a communication network 108. The imaging device 104 and the server 106 may be communicatively coupled to the electronic device 102 through the communication network 108. The electronic device 102 may be further coupled with the output device 110. The electronic device 102 may include a machine learning (ML) model 112.

The electronic device 102 may comprise suitable logic, circuitry, and interfaces that may be configured to execute the ML model 112. The electronic device 102 may receive a plurality of frames of a video from the imaging device 104. The video may include a first player and an object. The electronic device 102 may further track a movement of the object and a movement of the body part of the first player across the plurality of frames. The electronic device 102 may determine, based on the tracked movement, a frame of interest of the plurality of frames in which a degree of overlap between position coordinates of the object and position coordinates of the body part of the first player exceeds an overlap threshold. The electronic device 102 may detect a contact between the object and the body part of the first player based on the determined frame of interest. For example, the electronic device 102 may acquire the rules of the sport from the server 106 through the communication network 108. The electronic device 102 may apply the ML model 112 on the frame of interest and the tracked movement based on the acquired rules of the sport. The electronic device 102 may determine whether the detected contact is intentional or not based on the application of the ML model 112. The electronic device 102 may output, on the output device 110, one of a first notification for intentional contact or a second notification for unintentional contact based on the determination. Details of the detection of intentional contact between the object and the body part of the player using the machine learning model are further described, for example, in FIGS. 3-18. Examples of the electronic device 102 may include, but are not limited to, a computing device, an adaptive video assistance referee (VAR) system, a video-processing device, a mainframe machine, a server, a computer workstation, a video-tracking device, a computing device, a media processing system, a mobile device, a tablet computer, a computing device, a computer workstation, a mainframe computer, a handheld computer, a smartphone, a cellular phone, a mobile phone, a gaming device, or any other image processing device with image processing capabilities.

The imaging device 104 may include suitable logic, circuitry, and/or interfaces that may be configured to record a series of images (such as a video) of the field (such as a soccer field) and one or more players on the field. The video may include a plurality of frames. The imaging device 104 may include a single camera with movable angle of view or multiple cameras having different angles of view. In an embodiment, the imaging device 104 may be separate from the electronic device 102, and may be coupled to the electronic device 102 via the communication network 108. In another embodiment, the imaging device 104 may be integrated with the electronic device 102. The imaging device 104 may include one or more parameters, such as, resolution, field of view, angle of view, frame rate (for example, frames per second), magnification, and so on. In an embodiment, the parameters of the imaging device 104 may be controlled by the electronic device 102 via the communication network 108. For example, the electronic device 102 may control panning of the imaging device 104 to change the angle of view of the imaging device 104 to cover different regions of the field. In another embodiment, the parameters of the imaging device 104 may be controlled manually. The imaging device 104 may be panned to track a movement of the first player and the object on the field. The imaging device 104 may be configured to transmit the recorded video of the first player and the object to the electronic device 102 via the communication network 108. In one or more embodiments, the imaging device 104 may capture and transmit the plurality of frames of video of the first player and/or the object to the electronic device 102. Based on the plurality of frames of the video from the imaging device 104, the electronic device 102 may track the movement of the object and the movement of the body part of the first player. Examples of the imaging device 104 may include, but are not limited to, an image sensor, a wide-angle camera, an action camera, an event camera, a closed-circuit television (CCTV) camera, a surveillance camera, a camcorder, a digital camera, camera phones, a time-of-flight camera (ToF camera), a night-vision camera, a 360-degree camera, and/or other image capture devices.

The server 106 may include suitable logic, circuitry, and interfaces, and/or code that may be configured to store rules defined by the governing authority of the sport (such as soccer, football, or any ball sport). The server 106 may periodically update the rules of the sport based on a change in any rule of the sport. In an embodiment, the server 106 may transmit the rules of the sport to the electronic device 102 based on a request from the electronic device 102, or may transmit the rules as a real-time update. The server 106 may include a database to store the rules of the sport. In another embodiment, the server 106 may be further configured to train and store the ML model 112. The server 106 may be further configured to generate training data (such as labeled data for object detection and classification of contact as intentional and unintentional) for the ML model 112. The server 106 may train the ML model 112 on one or more features (such as one or more body parts of the first player, a trajectory of the movement of the object, pose information of the first player, color of a clothing of the first player, one or more areas of a playing surface (such as a field) associated with the first player, and rules of a sport associated with the first player) to classify the detected contact as one of intentional or unintentional. The training data associated with the ML model 112 may include labels for the object (such as the ball), the first player, color of clothing of different players of the sport, areas of the field, and so on). In an embodiment, the server 106 may be configured to store object detection data for detection of objects in the one or more frames of the video from the imaging device 104. The server 106 may be further configured to transmit the trained ML model 112 along with the training data and the object detection data to the electronic device 102. The server 106 may include one or more processors configured to execute high-computation tasks, machine learning, and so on. In an exemplary embodiment, the server 106 may be implemented as a cloud server and may execute operations through web applications, cloud applications, HTTP requests, repository operations, file transfer, and the like. Other examples of the server 106 may include, but are not limited to a database server, a file server, a web server, a media server, an application server, a mainframe server, a cloud server, or other types of servers. In one or more embodiments, the server 106 may be implemented as a plurality of distributed cloud-based resources by use of several technologies that are well known to those skilled in the art. A person with ordinary skill in the art will understand that the scope of the disclosure may not be limited to implementation of the server 106 and the electronic device 102 as separate entities. In certain embodiments, the functionalities of the server 106 may be incorporated in its entirety or at least partially in the electronic device 102, without departing from the scope of the disclosure.

The communication network 108 may include a communication medium through which the electronic device 102 may communicate with the imaging device 104 and/or the server 106. The communication network 108 may be one of a wired connection or a wireless connection. Examples of the communication network 108 may include, but are not limited to, a Wireless Fidelity (Wi-Fi) network, a Local Area Network (LAN), a Personal Area Network (PAN), a Wireless Personal Area Network (WPAN), a Wireless Local Area Network (WLAN), a Wireless Wide Area Network (WWAN), a cloud network, a Long Term Evolution (LTE) network, a Metropolitan Area Network (MAN), and/or the Internet. Various devices in the network environment 100 may be configured to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, IEEE 802.16, Long Term Evolution (LTE), light fidelity (Li-Fi), multi-hop communication, wireless access point (AP), device to device communication, cellular communication protocols, and Bluetooth (BT) communication protocols. In an embodiment, the electronic device 102 may acquire the one or more frames of the video from the imaging device 104 or may acquire the rules of the sport and the trained ML model 112 from the server 106 via the communication network 108.

The output device 110 may comprise suitable logic, circuitry, and interfaces that may be configured to render a first notification based on the determination that the contact is intentional or render a second notification based on the determination that the contact is unintentional. In an embodiment, the output device 110 may be part of the video assistant referee (VAR) system, and may output the notification to an on-field referee. In an embodiment, the output device 110 may be connected to the electronic device 102 by a wired connection (such as a high-definition multimedia interface (HDMI) connection) or a wireless connection (such as Wi-Fi). In another embodiment, the output device 110 may be integrated with the electronic device 102. The output device 110 (such as a display screen with integrated audio speaker) may include one or more controllable parameters, such as, brightness, contrast, aspect ratio, color saturation, audio volume, etc. The electronic device 102 may be configured to control the parameters of the output device 110 by transmitting one or more signals over the wired connection (such as the HDMI connection). The notification on the output device 110 may include, but is not limited to, a visual notification of whether the contact is intentional or not, or an audio notification of whether the contact is intentional or not. The output device 110 may be realized through several display technologies, such as an array of LEDs, a Liquid Crystal Display (LCD) display, a Light Emitting Diode (LED) display, a plasma display, and an Organic LED (OLED) display technology, and other display technologies. In accordance with an embodiment, the output device 110 may correspond to a display screen of a smart-glass device, a see-through display, a projection-based display, an electrochromic display, and/or a transparent display. In another embodiment, the output device 110 may include a display device with built-in speakers. In another embodiment, output device 110 may include an audio-only device, such as, a speaker, a soundbar, a smart speaker, and so on.

The machine learning (ML) model 112 (such as a convolutional neural network or a recurrent neural network) may be defined by its hyper-parameters, for example, activation function(s), number of weights, cost function, regularization function, input size, number of layers, and the like. The ML model 112 may be a computational network or a system of artificial neurons, arranged in a plurality of layers, as nodes. The plurality of layers of the ML model 112 may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the ML model 112. Outputs of each hidden layer may be coupled to inputs of at least one node in other layers of the ML model 112. Node(s) in the final layer may receive inputs from at least one hidden layer to output a result. The number of layers and the number of nodes in each layer may be determined from hyper-parameters of the ML model 112. Such hyper-parameters may be set before, while training, or after training the ML model 112 on a training dataset.

Each node of the ML model 112 may correspond to a mathematical function (e.g., a sigmoid function or a rectified linear unit) with a set of parameters, tunable during training of the ML model 112. The set of parameters may include, for example, a weight parameter, a regularization parameter, and the like. Each node may use the mathematical function to compute an output based on one or more inputs from nodes in other layer(s) (e.g., previous layer(s)) of the ML model 112. All or some of the nodes of the ML model 112 may correspond to the same or a different mathematical function.

In accordance with an embodiment, the electronic device 102 or the server 106 may train the ML model 112 on one or more features related to objects, rules, and players of the sport to obtain the trained ML model 112. The electronic device 102 or the server 106 may train the ML model 112 on one or more features to classify the detected contact as one of intentional or unintentional. The one or more features comprise one or more body parts of the first player, a trajectory of the movement of the object, pose information of the first player, color of a clothing of the first player, one or more areas of a playing surface associated with the first player, the movement of the first player, rules of a sport associated with the first player, and so on. The ML model 112 may be trained to classify the object and the players in each frame of the plurality of frames. For example, the electronic device 102 may input several frames of the video from the imaging device 104 and associated information to the ML model 112 to train the ML model 112. For example, the frames may include image frames at different time instant.

In training the ML model 112, one or more parameters of each node of the ML model 112 may be updated based on whether an output of the final layer for a given input (from the training dataset) matches a correct result based on a loss function for the ML model 112. The above process may be repeated for the same or a different input until a minima of loss function may be achieved, and a training error may be minimized. Several methods for training are known in art including, for example, logistic regression, naive bayes, K-Nearest Neighbors, decision trees, random forest, support vector machine, gradient descent, stochastic gradient descent, batch gradient descent, gradient boost, meta-heuristics, and the like.

The ML model 112 may include electronic data, which may be implemented as, for example, a software component of an application executable on the electronic device 102. The ML model 112 may rely on libraries, external scripts, or other logic/instructions for execution by a processing device, such as circuitry. The ML model 112 may include code and routines configured to enable a computing device, such as the circuitry to perform one or more operations for detection of the object and players from the plurality of frames. Additionally or alternatively, the ML model 112 may be implemented using hardware including a processor, a microprocessor (e.g., to perform or control performance of one or more operations), a field-programmable gate array (FPGA), or an application-specific integrated circuit (ASIC). Alternatively, in some embodiments, the ML model 112 may be implemented using a combination of hardware and software. Examples of the ML model 112 may include, but are not limited to, a deep neural network (DNN), a convolutional neural network (CNN), R-CNN, Fast R-CNN, Faster R-CNN, an artificial neural network (ANN), (You Only Look Once) YOLO network, CNN+ANN, a fully connected neural network, and/or a combination of such networks. In certain embodiments, the ML model 112 may be based on a hybrid architecture of multiple deep neural networks (DNNs).

In operation, the electronic device 102 may receive a user request for review of a foul (such as a handball event), and may receive a plurality of frames of a video from the imaging device 104. The video may include a first player and an object (such as a ball). The electronic device 102 may apply the ML model 112 to track a movement of the object and a movement of a body part of the first player across the plurality of frames. For example, the electronic device may apply the ML model on each frame of the received plurality of frames to determine relative positions of the object (such as the ball) and the body part (such as hand) of the first player in each frame. Based on the relative positions, the electronic device 102 may track the movement of the object and the movement of the body part of the first player. The electronic device 102 may analyze each frame of the plurality of frames and determine one or more frames in which the object overlaps the body part of the first player. The electronic device 102 may further determine a degree of overlap between position coordinates of the object and position coordinates of the body part of the first player. The electronic device 102 may further determine, based on the tracked movement, a frame of interest in which the degree of overlap between position coordinates of the object and position coordinates of the body part of the first player exceeds an overlap threshold. For example, the electronic device 102 may determine whether a degree of overlap between a first bounding box of the object and a second bounding box of the body part of the first player exceeds the overlap threshold. The electronic device 102 may detect a contact between the object and the body part of the first player based on the determined frame of interest. The electronic device 102 may apply the ML model 112 on the frame of interest and the tracked movement to determine whether the detected contact is intentional or unintentional. The electronic device 102 may output a first notification that indicates intentional contact on the output device 110 based on the determination that the contact is intentional. The electronic device 102 may output a second notification that indicates unintentional contact on the output device 110 based on the determination that the contact is unintentional. The first notification or the second notification by the output device 110 may include a visual notification or an audio notification. Details of the detection of intentional or unintentional contact between the object with the body part of the first player are described, for example, in FIGS. 3-18.

The electronic device 102 may automatically determine whether the contact between the object (such as the ball) and the body part (such as the hand) of the first player is intentional by the application of the machine learning model, to thereby eliminate human errors in the decision of the foul and to significantly improve the time required to make the decision. The electronic device 102 may further significantly improve accuracy of the detection of the handball event based on several determining factors in compliance with the rules defined by the governing authority of the sport. The electronic device 102 may further assist a referee to determine whether the contact is intentional based on a notification of the intentional contact with proper reasoning to the referee, to thereby expedite the process of the decision of the foul (such as the handball event) by the referee.

In an embodiment, the electronic device 102 may determine a trajectory of the movement of the object in one or more previous frames of the plurality of frames prior to the frame of interest in which the degree of overlap exceeds the overlap threshold. The electronic device 102 may predict, based on the trajectory of the movement, the position coordinates of the object in one or more subsequent frames of the plurality of frames subsequent to the frame of interest. The electronic device 102 may determine a change in the trajectory of the object (such as the ball) in the one or more subsequent frames. The determination of the change in trajectory may be based on a difference between the predicted position coordinates and actual coordinates of the object in the one or more subsequent frames that exceeds a threshold range. The electronic device 102 may detect the contact between the object and the body part of the first player based on the determined change in the trajectory of the object in the one or more subsequent frames. Details of the determination of the change in trajectory of the object (such as the ball) are described, for example, in FIG. 6.

Figure 2:
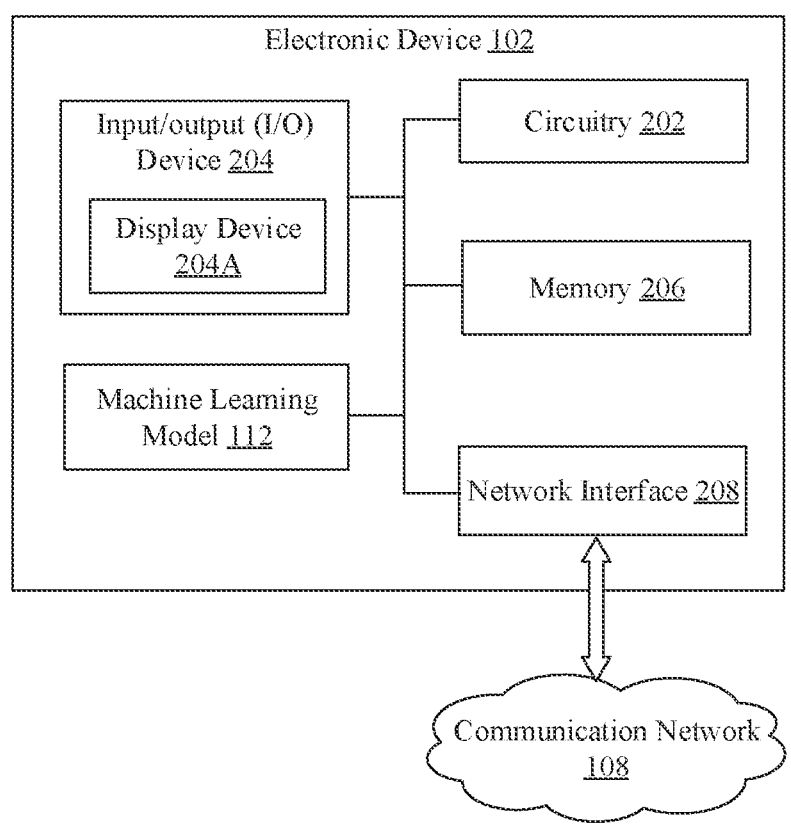
FIG. 2 is a block diagram that illustrates an exemplary electronic device for detection of intentional contact between an object and a body part of a first player in a sport using a machine learning model, in accordance with an embodiment of the disclosure.

FIG. 2 is a block diagram that illustrates an exemplary electronic device for detection of intentional contact between an object and a body part of a first player in a sport using a machine learning model, in accordance with an embodiment of the disclosure. FIG. 2 is explained in conjunction with elements from FIG. 1. With reference to FIG. 2, there is shown a block diagram 200 of an electronic device 102. The electronic device 102 may include circuitry 202, an Input/Output (I/O) device 204, a memory 206, a network interface 208, and a machine learning (ML) model 112. The I/O device 204 may include a display device 204A. The circuitry 202 may be communicatively coupled to the I/O device 204, the memory 206, the network interface 208, and the ML model 112. The circuitry 202 may communicate with the communication network 108 via the network interface 208.

The circuitry 202 may include suitable logic, circuitry, and interfaces that may be configured to execute program instructions associated with different operations to be executed by the electronic device 102. For example, some of the operations may include reception of a plurality of frames of the video, tracking of a movement of the object and a movement of a body part of the first player across the plurality of frames, determination of a frame of interest, detection of a contact between the object and the body part of the first player, application of the ML model 112 on the frame of interest and the tracked movement to determine whether the contact is intentional. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The I/O device 204 may include suitable logic, circuitry, and interfaces that may be configured to receive a user query to determine whether contact between the object and the body part of the first player is intentional. The I/O device 204 output the one of the first notification or the second notification (for example, a visual notification or an audio notification). The I/O device 204 may include the display device 204A to display the first notification or the second notification based on the determination whether the contact is intentional or unintentional. In an embodiment, the I/O device 204 may be associated with the output device 110. The I/O device 204, which may include various input and output devices, may be configured to communicate with the circuitry 202. Examples of such input and output devices may include, but are not limited to, a touchscreen, a keyboard, a mouse, a joystick, a microphone, a display device, a speaker, and/or a vibration actuator. The I/O device 204 may include a touch screen display which may receive a user input by touch input. The touch screen may be at least one of a resistive touch screen, a capacitive touch screen, or a thermal touch screen. The touch screen display may be realized through several known technologies such as, but not limited to, at least one of a Liquid Crystal Display (LCD) display, a Light Emitting Diode (LED) display, a plasma display, or an Organic LED (OLED) display technology, or other display devices.

The memory 206 may include suitable logic, circuitry, and interfaces that may be configured to store one or more instructions to be executed by the circuitry 202. In an embodiment, the memory 206 may be configured to store a local version of the rules of the sport. The rules of the sport may include a list of rules associated with fouls (such as intentional handball event) defined by a governing authority of the sport. For example, the circuitry 202 may receive the rules of the sport from the server 106 and store the rules of the sport in the memory 206. The memory 206 may further store information associated with the color of a clothing of the first player and other players, one or more areas (such as a penalty area) of a playing surface associated with the first player, and so on. The memory 206 may be further configured to store the ML model 112 that may be configured to determine the whether the contact between the object and the body part of the first player is intentional. The memory 206 may be further configured to store the training data for the ML model 112 and the object detection data received from the server 106. Examples of implementation of the memory 206 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 208 may include suitable logic, circuitry, and interfaces that may be configured to facilitate communication between the electronic device 102, the imaging device 104, and the server 106. The electronic device 102 may receive the plurality of frames of the video from the imaging device 104 via the network interface 208. The electronic device 102 may receive the rules of the sport, the ML model 112, and the training data from the server 106 via the network interface 208. The network interface 208 may be implemented by use of various known technologies to support wired or wireless communication of the electronic device 102 with the communication network 108. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, a radio-frequency identification (RFID) tag, a Bluetooth™ transceiver, or a local buffer circuitry. The network interface 208 may be configured to communicate via wireless communication with networks, such as the Internet, an Intranet or a wireless network, such as a cellular telephone network, a wireless local area network (LAN), a metropolitan area network (MAN), and a satellite communication network. The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth®, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

Although FIG. 2 illustrates the electronic device 102 includes the circuitry 202, the I/O device 204, the memory 206, the network interface 208, and the ML model 112, the disclosure may not be limited in this regard. Accordingly, the electronic device 102 may include more or less components to perform the same or other functions of the electronic device 102. The functions or operations executed by the electronic device 102, as described in FIG. 1, may be performed by the circuitry 202. Operations executed by the circuitry 202 are described in detail, for example, in FIGS. 3-18.

Figure 3:
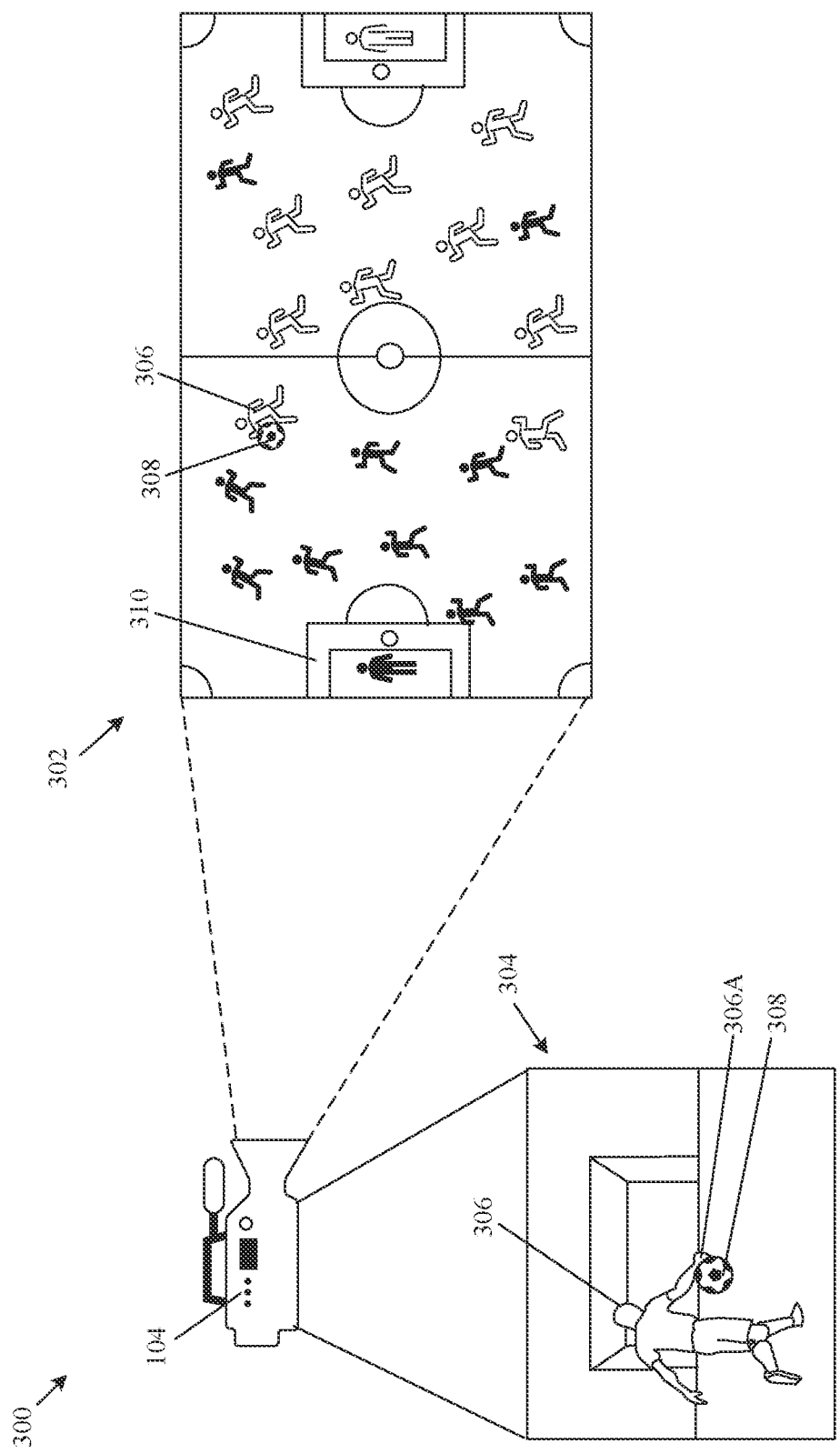
FIG. 3 illustrates a diagram that illustrates an exemplary scenario for detection of intentional contact between an object and a body part of a first player using a machine learning model, in accordance with an embodiment of the disclosure.

FIG. 3 illustrates a diagram that illustrates an exemplary scenario for detection of intentional contact between an object and a body part of a first player using a machine learning model, in accordance with an embodiment of the disclosure. FIG. 3 is explained in conjunction with elements from FIGS. 1 and 2. With reference to FIG. 3, there is shown an exemplary scenario 300. In the exemplary scenario 300, there is shown the imaging device 104 that may record a video of a field 302 (such as a soccer field), and a frame of interest 304.

In accordance with an embodiment, the video may include a plurality of frames. The imaging device 104 may transmit the plurality of frames to the circuitry 202 via the communication network 108. The imaging device 104 may include a standalone camera or may include a plurality of cameras at different locations on and around the field. The plurality of cameras may capture the field and the players on the field from different points of view. The captured images of the field may include one or more players (including the first player 306) from opponent sides, the object 308 (such as the ball), goalposts, goalkeepers, line markings on the field including a penalty area 310, halfway line, goal lines, center circle, and the center spot. The plurality of frames may include the frame of interest 304 in which the degree of overlap between position coordinates of the object 308 (such as the ball) and position coordinates of a body part 306A (such as the hand) of the first player 306 exceeds an overlap threshold from one or more points of view. The object 308 (such as the ball) may be in contact with the body part (such as hand) of the first player in the frame of interest 304.

Figure 4:
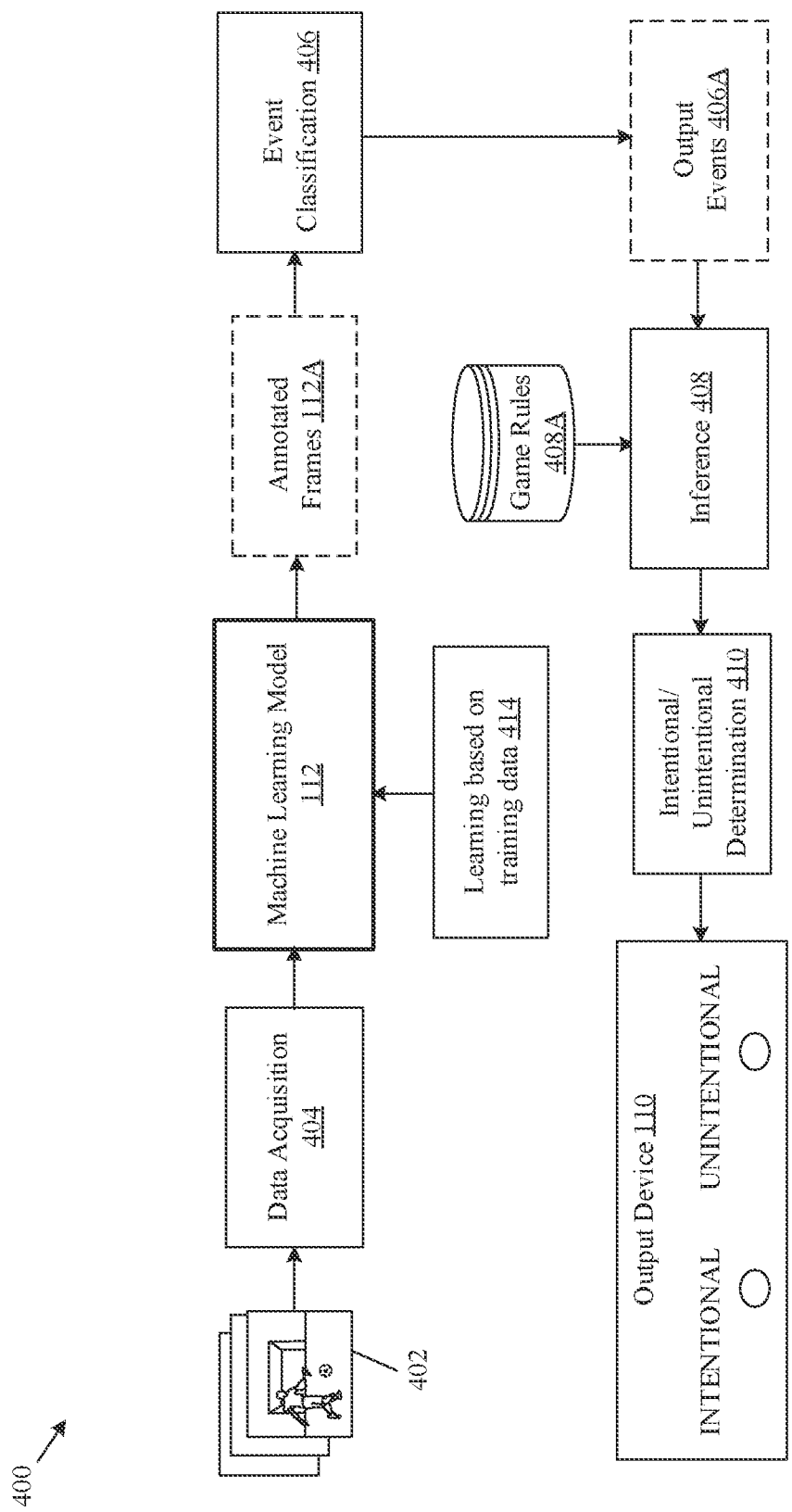
FIG. 4 is a block diagram that illustrates exemplary operations for detection of intentional contact between an object and a body part of a first player using a machine learning model, in accordance with an embodiment of the disclosure.

FIG. 4 is a block diagram that illustrates exemplary operations for detection of intentional contact between an object and a body part of a first player using a machine learning model, in accordance with an embodiment of the disclosure. FIG. 4 is explained in conjunction with elements from FIGS. 1-3. With reference to FIG. 4, there is shown exemplary block diagram 400 that illustrates exemplary operations from 404 to 410, as described herein. The exemplary operations illustrated in the exemplary block diagram 400 may start at 404 and may be performed by any computing system, apparatus, or device, such as by the electronic device 102 of FIG. 1 or circuitry 202 of FIG. 2. Although illustrated with discrete blocks, the exemplary operations associated with one or more blocks of the exemplary block diagram 400 may be divided into additional blocks, combined into fewer blocks, or eliminated, depending on the particular implementation.

At 404, acquisition of a plurality of frames 402 may be performed. In the acquisition of the plurality of frames 402, the circuitry 202 may receive the plurality of frames 402 of a video of the field 302 from the imaging device 104. In an embodiment, the imaging device 104 may record the video of the field 302 from multiple viewpoints. In another embodiment, a set of imaging parameters (such as focus, zoom, field-of-view (FoV), exposure, shutter speed, sharpness, etc.) related to the imaging device 104 may be controlled during the acquisition of the plurality of frames 402. For example, the circuitry 202 may set a value of one or more imaging parameters of the set of imaging parameters.

The circuitry 202 may provide the acquired plurality of frames 402 to the ML model 112. The ML model 112 may identify the object 308 and the first player 306 in the plurality of frames 402. The ML model 112 may further determine key points of the body of the first player 306. Based on the identified object 308 and the determined key points of the body of the first player 306, the ML model 112 may track the object 308 and the body part 306A of the first player 306. The ML model 112 may acquire learning 414 based on the training of the ML model 112 using the training data. Based on the acquired learning, the ML model 112 may process the plurality of frames 402 to output a plurality of annotated frames 112A. The plurality of annotated frames 112A may include a bounding box for the object 308, a bounding box for the first player 306, a bounding box for the body part 306A of the first player 306, and the key points of the first player 306. Details of the ML model 112 may be further described, for example, in FIG. 5.

At 406, event classification may be performed. The circuitry 202 may provide the plurality of annotated frames for the event classification. In the event classification, the circuitry 202 may analyze the plurality of annotated frames to determine one or more events associated with the object 308 and the body part 306A of the first player 306. For example, the circuitry 202 may determine a contact (such as the handball event) between the object 308 and the body part 306A of the first player 306, determine whether the first player 306 is a goalkeeper, determine whether the object 308 changed trajectory subsequent to the contact, determine a source of hit prior to the contact, determine velocity of movement of the object 308 and the body part 306A, and so on. In an embodiment, the circuitry 202 may detect a frame of interest 304 in which the contact between the object 308 and the body part 306A of the first player 306 exceeds the overlap threshold, and may detect a handball event (such as handling the ball) based on the frame of interest 304. The circuitry 202 may detect and output one or more other events following the detection of the handball event based on the analysis of the frame of interest 304. For example, the circuitry 202 may output events such as whether the first player fell during the detected contact, velocity of hand movement of the first player 306, proximity of the first player 306 to other players, whether the first player 306 is a goalkeeper, whether the goalkeeper is within the penalty area 310, a number of passes of the object 308 (such as the ball) before scoring a goal subsequent to the handball event, whether the arms of the first player 306 are stretched above the shoulder in the frame of interest 304, the source of hit prior to the contact with the object 308, and so on.

At 408, an inference process may be performed based on the events detected in the event classification. In the inference process, the circuitry 202 may acquire game rules 408A defined by the governing authority (such as international football association board (IFAB)) of the sport from the server 106 or the memory 206. The circuitry 202 may validate the detected events against the game rules 408A of the sport.

At 410, a determination may be made of whether the contact is intentional or unintentional. The circuitry 202 may determine whether the contact between the object 308 and the body part 306A of the first player 306 in the frame of interest 304 is intentional or unintentional based on the validation of the detected events against the rules of the sport. The circuitry 202 may compare the scenarios of the detected events with the rules of the sport, and may determine whether the contact is intentional or not based on the comparison.

The output device 110 may output a notification based on the result of the determination. The output device 110 may output a first notification based on the determination that the contact is intentional, and may output a second notification based on the determination that the contact is unintentional. In an embodiment, the output device 110 may display a mark or indicia corresponding to a label "intentional" or "unintentional" to indicate the result of the determination. In an embodiment, the output device 110 may be part of the video assistant referee (VAR) system, and may output the notification to an on-field referee.

Figure 5:
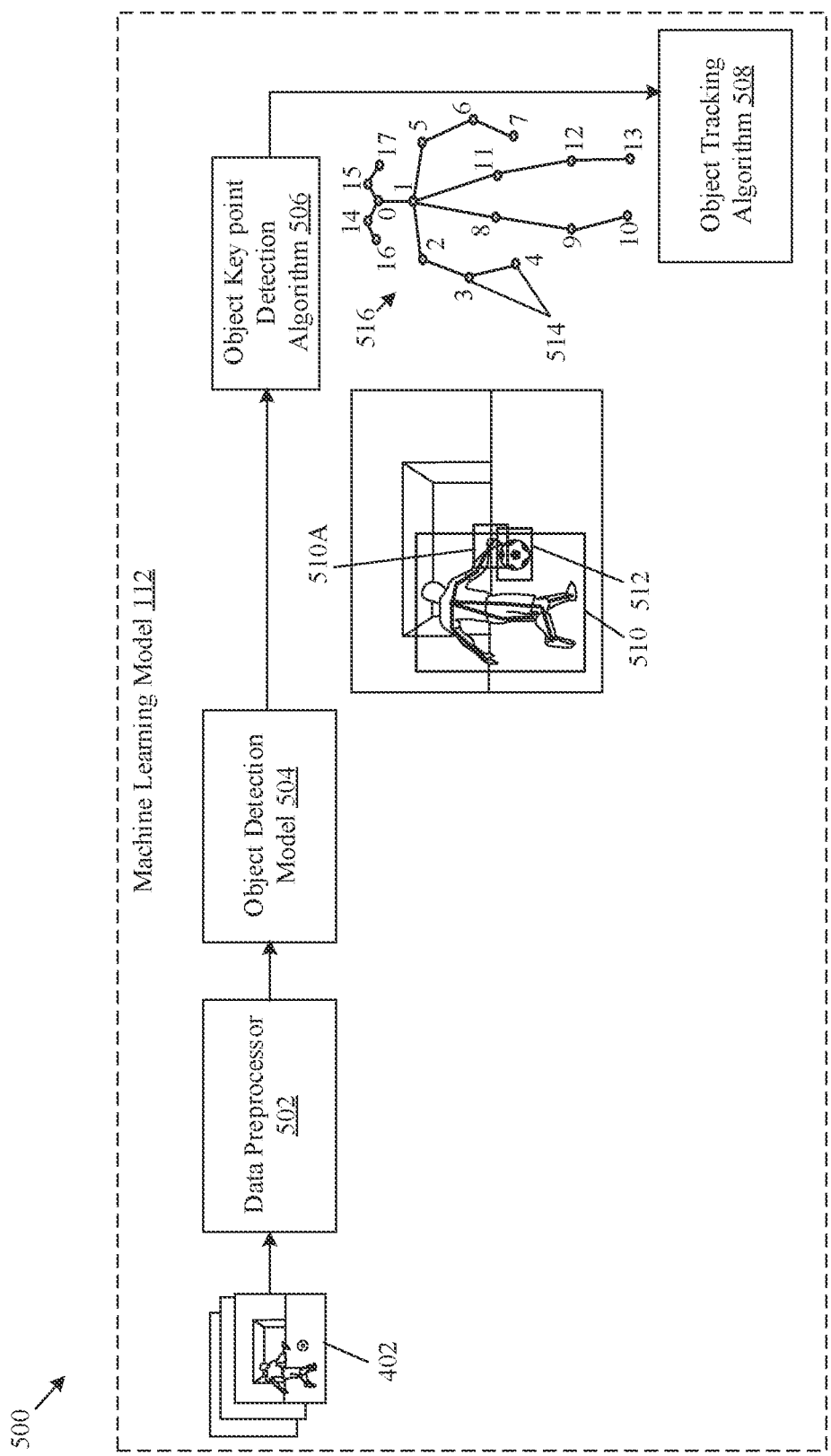
FIG. 5 is a block diagram that illustrates architecture of a machine learning model for detection of intentional contact between an object and a body part of a first player, in accordance with an embodiment of the disclosure.

FIG. 5 is a block diagram that illustrates architecture of a machine learning model for detection of intentional contact between an object and a body part of a first player, in accordance with an embodiment of the disclosure. FIG. 5 is explained in conjunction with elements from FIGS. 1-4. With reference to FIG. 5, there is shown exemplary block diagram 500. In the exemplary block diagram 500, there are shown the components of the ML model 112.

The ML model 112 may include, for example, a data preprocessor 502, an object detection model 504, an object key point detection algorithm 506, and an object tracking algorithm 508. The data preprocessor 502 may receive the plurality of frames 402 and may process the data associated with the plurality of frames 402. For example, the data preprocessor 502 may remove noise from the plurality of frames 402, enhance the quality of images of the plurality of frames 402, highlight the boundaries between the objects in the plurality of frames 402, and so on. The data preprocessor 502 may transmit the processed plurality of frames 402 to the object detection model 504.

The object detection model 504 may receive the processed plurality of frames 402. The object detection model 504 may detect the objects of interest (such as the object 308 and the body part 306A of the first player 306) from the plurality of frames 402. Example of the object detection model 504 may include Yolo V3. The object detection model 504 may determine a bounding box for each object of the detected objects in each frame of the plurality of frames. For example, the bounding boxes may define the boundaries (rectangular or circular boundaries) of regions that may include the objects of interest. The object detection model 504 may determine coordinates of a bounding box 510 of the first player 306, coordinates of a bounding box 510A of the body part 306A of the first player 306, coordinates of a bounding box 512 of the object 308, and so on. The object detection model 504 may overlay the body part 306A with the bounding box 510A, and the object 308 with the bounding box 512, and the first player 306 with the bounding box 510 in the plurality of frames 402. In an embodiment, the object detection model 504 may assign a class label to the bounding box 510, the bounding box 510A, and the bounding box 512.

The object key point detection algorithm 506 may receive the plurality of frames 402 along with the bounding box 510, the bounding box 510A, and the bounding box 512. The object key point detection algorithm 506 may extract skeleton information 516 associated with the body of the first player 306 in a frame of interest 304 of the plurality of frames 402, and may detect key points 514 of the body of the first player 306 based on the skeleton information 516. The object key point detection algorithm 506 may determine the coordinates of the key points 514 of the first player 306. The key points 514 may include points corresponding to joints of arms (such as points 3, 4, 6, and 7), shoulder (such as points 2 and 5), joints of legs (such as points 9, 10, 12, and 13), hip region (such as points 8 and 11), neck and head (such as points 0, 1, 14, 15, 16, and 17), etc. of the body of the first player 306. The object key point detection algorithm 506 may temporarily store the determined key points 514 of the players in the memory 206. The object key point detection algorithm 506 may output the plurality of frames along with the key points 514 to the object tracking algorithm 508.

The object tracking algorithm 508 may receive the plurality of frames 402 along with the skeleton information 516, the key points 514, the bounding box 510, the bounding box 510A, and the bounding box 512. The object tracking algorithm 508 may track the objects (such as the object 308 and the body part 306A of the first player 306) in the plurality of frames 402. The object tracking algorithm 508 may include one or more algorithms (for example, Deep Sort algorithm) to track the objects in the plurality of frames 402. The object tracking algorithm 508 may additionally employ a Kalman filter to treat noise in the detection of the objects of interest (such as the object 308 and the body part 306A of the first player 306). The object tracking algorithm 508 may track the objects of interest (such as the object 308 and the body part 306A of the first player 306) in the plurality of frames 402 to determine changes in the coordinates of the bounding box 510A and the coordinates of the bounding box 512, and may determine the amount and direction of movement of the objects of interest. Based on the execution of the object tracking algorithm 508, the ML model 112 may output a plurality of annotated frames that may include the bounding box 512 for the object 308, the bounding box 510A for the body part 306A of the first player 306, and the key points 514 of the first player 306 for event classification, as described in FIG. 4.

Figure 6:
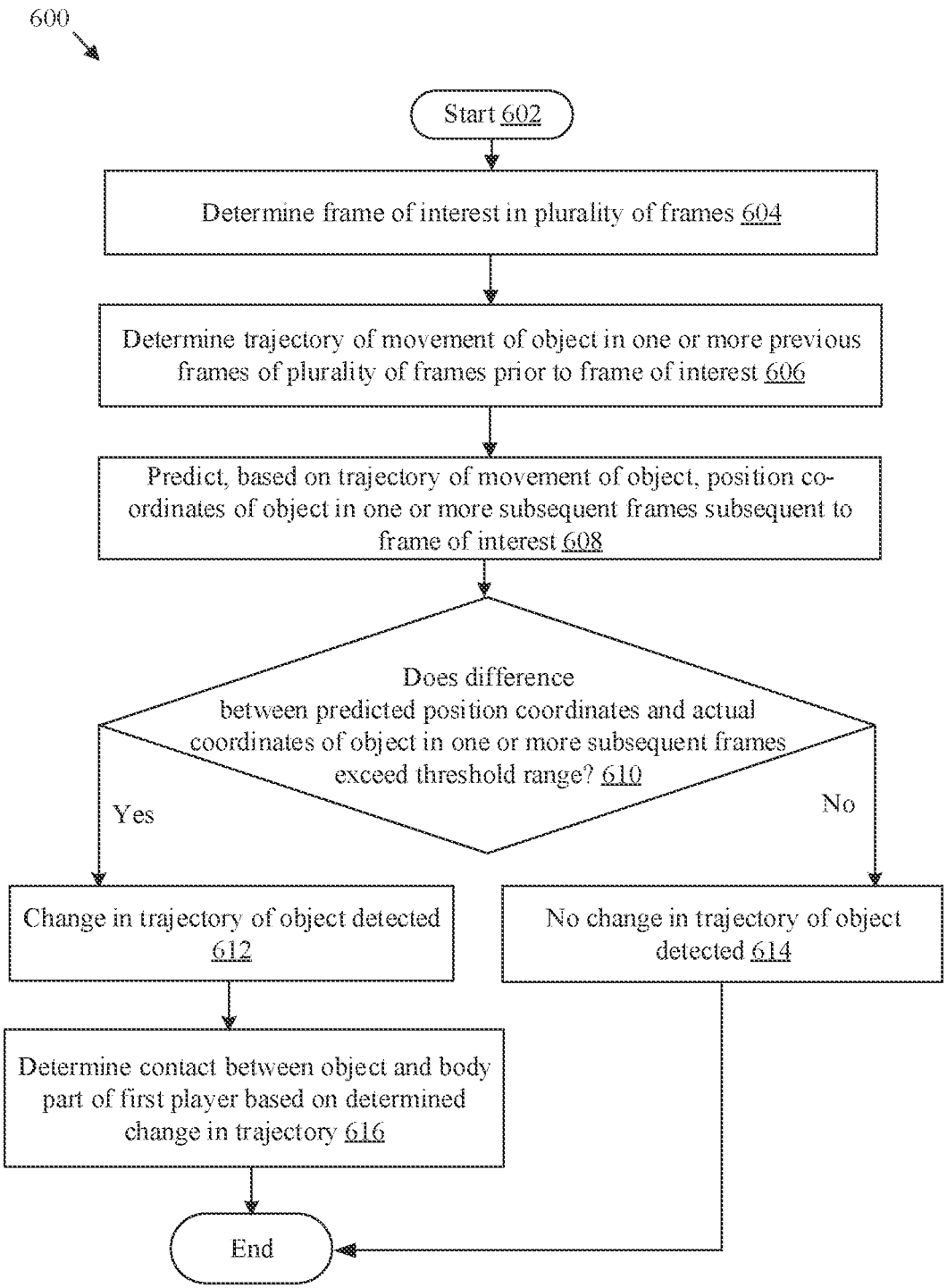
FIG. 6 is a flowchart that illustrates an exemplary method for detection of intentional contact between an object and a body part of a first player based on change in a trajectory of the object, in accordance with an embodiment of the disclosure.

FIG. 6 is a flowchart that illustrates an exemplary method for detection of intentional contact between an object and a body part of a first player based on change in a trajectory of the object, in accordance with an embodiment of the disclosure. FIG. 6 is explained in conjunction with elements from FIGS. 1-5. With reference to FIG. 6, there is shown an exemplary flowchart 600 that illustrates exemplary operations from 602 to 616, as described herein. The operations from 602 to 616 may be executed by any computing system, such as by the electronic device 102, or the circuitry 202. The method may start at 602 and may proceed to 616.

At 604, the frame of interest (such as the frame of interest 304) in the plurality of frames 402 may be determined. In accordance with an embodiment, the circuitry 202 may be configured to determine the frame of interest 304 in the plurality of frames 402 in which a degree of overlap between position coordinates of the bounding box for the object 308 and position coordinates of the bounding box of the body part 306A of the first player 306 exceeds an overlap threshold. Details of the determination of the frame of interest 304 are provided, for example, in FIGS. 1-4.

At 606, a trajectory of the movement of the object 308 (such as the ball) in one or more previous frames of the plurality of frames 402 prior to the frame of interest 304 may be determined. In accordance with an embodiment, the circuitry 202 may be configured to determine the trajectory of the movement of the object 308 in one or more previous frames of the plurality of frames 402 prior to the frame of interest 304. For example, the circuitry 202 may read N frames prior to the frame of interest 304. In an embodiment, the circuitry 202 may generate a heatmap of the trajectory of the movement of the object 308. The circuitry 202 may determine the coordinates of the center of the object 308 in each frame of the one or more frames prior to the frame of interest 304 to determine the trajectory.

At 608, position coordinates of the object 308 in one or more subsequent frames subsequent to the frame of interest 304 may be predicted. The circuitry 202 may predict, based on the trajectory of the movement of the object 308, the position coordinates of the object 308 in one or more subsequent frames subsequent to the frame of interest 304. For example, the circuitry 202 may predict the next N points in the trajectory of the object 308 using a curve fitting process or change point detection process.

At 610, a determination may be made whether a difference between predicted position coordinates and actual position coordinates of the object 308 in one or more subsequent frames exceeds a threshold range. The circuitry 202 may compare the difference between the predicted position coordinates and the actual position coordinates of the object 308 in one or more subsequent frames with the threshold range. The circuitry 202 may be further configured to determine whether the difference exceeds the threshold range. Based on the determination that the difference exceeds the threshold range, the control may pass to 612. Otherwise, the control may pass to 614.

At 612, a change in the trajectory of the object 308 may be detected. The circuitry 202 may detect the change in the trajectory of the object 308 based on the determination that the difference exceeds the threshold range.

At 614, a change in trajectory of the object 308 may not be detected. The circuitry 202 may detect that the object 308 may not change its trajectory based on the determination that the difference exceeds the threshold range. Control may pass to end.

At 616, a contact between the object 308 and the body part 306A of the first player 306 may be determined. The circuitry 202 may determine the contact between the object 308 and the body part 306A of the first player 306 based on the change in trajectory of the object 308 (such as the ball). For example, the circuitry 202 may determine that the object 308 may be in contact of the body part 306A of the first player 306 in the frame of interest 304 based on the change in trajectory of the object 308. The control may pass to end.

Figure 7:
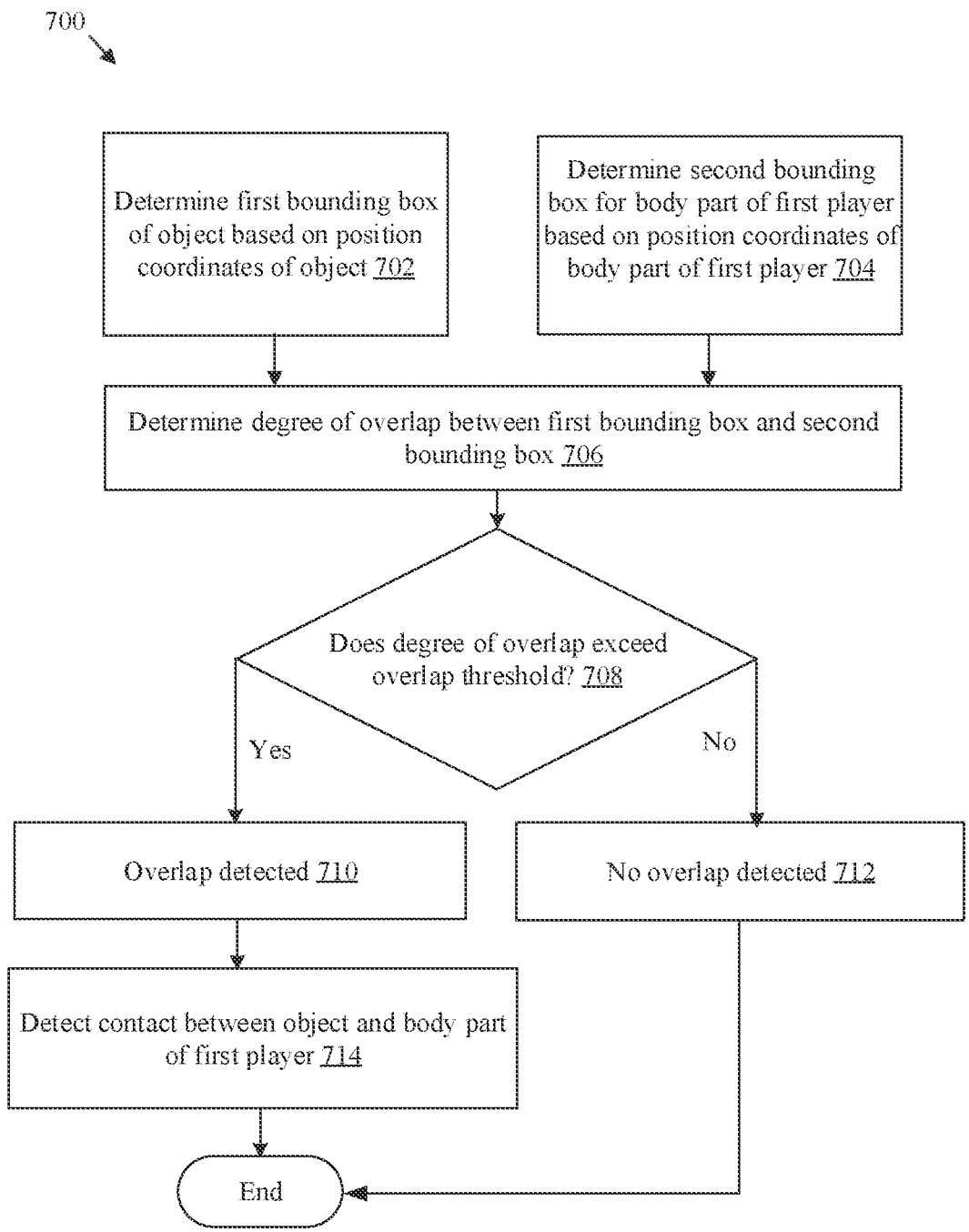
FIG. 7 is a flowchart that illustrates an exemplary method for detection of intentional contact between an object and a body part of a first player based on an overlap between the object and the body part of the first player, in accordance with an embodiment of the disclosure.

FIG. 7 is a flowchart that illustrates an exemplary method for detection of intentional contact between an object and a body part of a first player based on an overlap between the object and the body part of the first player, in accordance with an embodiment of the disclosure. FIG. 7 is explained in conjunction with elements from FIGS. 1-6. With reference to FIG. 7, there is shown an exemplary flowchart 700 that illustrates exemplary operations from 702 to 714, as described herein. The operations from 702 to 714 may be executed by any computing system, such as by the electronic device 102, or the circuitry 202. The method may start at 702 and may proceed to 714.

At 702, a bounding box (such as a first bounding box 512) of the object 308 may be determined based on position coordinates of the object 308. The circuitry 202 may determine the position coordinates of the object 308. The circuitry 202 may determine the first bounding box 512 of the object 308 based on the determined position coordinates of the object 308 in the frame of interest 304. Details of the determination of the first bounding box 512 are provided, for example, in FIGS. 1 and 5.

At 704, a bounding box (such as a second bounding box 510A) of the body part 306A of the first player 306 may be determined based on position coordinates of the body part 306A of the first player 306. The circuitry 202 may determine the position coordinates of the body part 306A (for example, the lower arm and $\frac{3}{4}^{th}$ of the upper arm) of the first player 306. The circuitry 202 may further determine the second bounding box 510A of the body part 306A of the first player 306 based on the determined position coordinates of the body part 306A of the first player 306 in the frame of interest 304. In an embodiment, the circuitry 202 may determine the second bounding box for the lower arm and $\frac{3}{4}^{th}$ of the upper arm of each hand of the first player 306. Details of the determination of the second bounding box 510A are provided, for example, in FIGS. 1 and 5.

At 706, a degree of overlap between the first bounding box 512 and the second bounding box 510A may be determined. The circuitry 202 may determine the degree of overlap between the first bounding box 512 and the second bounding box 510A based on the position coordinates of the first bounding box 512 and the position coordinates of the second bounding box 510A.

At 708, determine whether the degree of overlap between the first bounding box 512 and the second bounding box 510A exceeds an overlap threshold (such as 50-75% overlap). The circuitry 202 may determine whether the degree of overlap between the first bounding box 512 and the second bounding box 510A may exceed the overlap threshold. In an embodiment, the circuitry 202 may determine at least four coordinates of each of the first bounding box 512 and the second bounding box 510A, and determine whether the degree of overlap between the at least four coordinates of the first bounding box 512 and the corresponding at least four coordinates of the second bounding box 510A exceed the overlap threshold. Based on the determination that the degree of overlap exceeds the overlap threshold, the control may pass to 710. Otherwise, the control may pass to 712.

At 710, an overlap between the first bounding box 512 and the second bounding box 510A may be detected. The circuitry 202 may detect that the first bounding box 512 may overlap the second bounding box 510A, and the control may pass to 714. At 712, an overlap between the first bounding box 512 and the second bounding box 510A may not be detected. The circuitry 202 may detect that the first bounding box 512 may not overlap the second bounding box 510A, and the control may pass to end.

At 714, a contact between the object 308 and the body part 306A of the first player 306 may be detected. The circuitry 202 may determine contact between the object 308 and the body part 306A of the first player 306 based on the overlap between the first bounding box 512 and the second bounding box 510A. For example, the circuitry 202 may determine that the object 308 may be in contact with the body part 306A (for example, the lower arm and $\frac{3}{4}^{th}$ of the upper arm) of the first player 306 in the frame of interest 304 based on the overlap. The control may pass to end.

Figure 8:
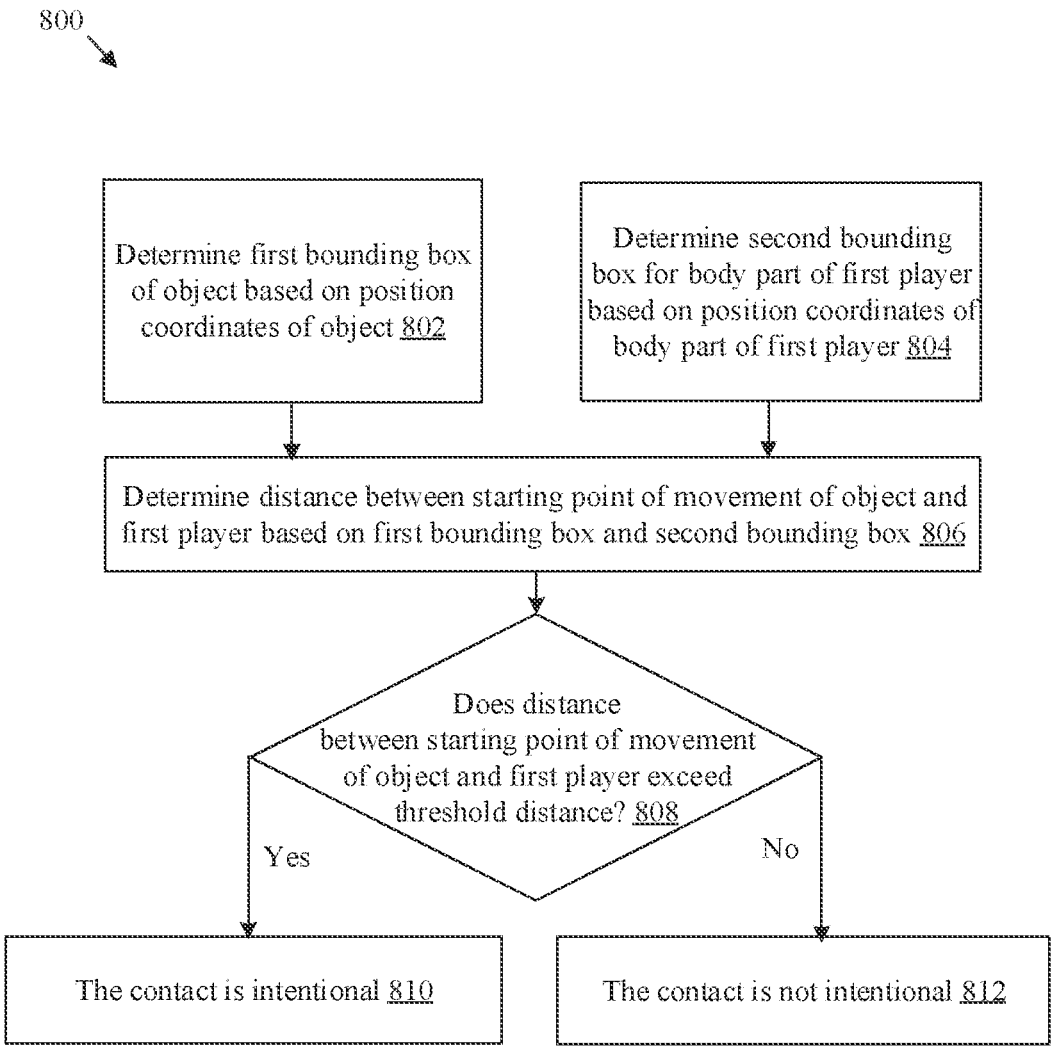
FIG. 8 is a flowchart that illustrates an exemplary method for detection of intentional contact between an object and a body part of a first player in a sport based on a distance between a starting point of the movement of the object and the first player, in accordance with an embodiment of the disclosure.

FIG. 8 is a flowchart that illustrates an exemplary method for detection of intentional contact between an object and a body part of a first player in a sport based on a distance between a starting point of the movement of the object and the first player, in accordance with an embodiment of the disclosure. FIG. 8 is explained in conjunction with elements from FIGS. 1-7. With reference to FIG. 8, there is shown an exemplary flowchart 800 that illustrates exemplary operations from 802 to 812, as described herein. The operations from 802 to 812 may be executed by any computing system, such as by the electronic device 102, or the circuitry 202. The method may start at 802 and may proceed to 812.

At 802, a first bounding box (such as a first bounding box 512) of the object 308 may be determined based on position coordinates of the object 308. The circuitry 202 may determine the first bounding box 512 of the object 308 based on the position coordinates of the object 308 in the frame of interest 304. Details of the determination of the first bounding box 512 are provided, for example, in FIGS. 1 and 5.

At 804, a second bounding box (such as a second bounding box 510A) of the body part 306A of the first player 306 may be determined based on position coordinates of the body part 306A of the first player 306. The circuitry 202 may determine the second bounding box 510A of the body part 306A of the first player 306 based on the determined position coordinates of the body part 306A of the first player 306 in the frame of interest 304. Details of the determination of the second bounding box 510A are provided, for example, in FIGS. 1 and 5.

At 806, a distance between a starting point of movement of the object 308 and the first player 306 may be determined. The circuitry 202 may determine the distance between the starting point of the movement of the object 308 and the first player 306 based on the first bounding box 512 and the second bounding box 510A. The starting point of the movement of the object 308 may be a point from where the object 308 may start moving prior to the contact between the object 308 and the body part 306A of the first player 306.

At 808, determine whether the distance between the starting point of movement of the object 308 and the first player exceeds a threshold distance. The circuitry 202 may be configured to determine whether the distance between the starting point of the movement of the object 308 and the first player 306 may exceed the threshold distance. Based on the determination that distance between the starting point of movement of the object 308 and the first player exceeds the threshold distance, the control may pass to 810. Otherwise, the control may pass to 812.

At 810, determine that the contact is intentional. The circuitry 202 may determine that the contact between the first player 306 and the object 308 may be intentional in case the starting point of the movement of the object 308 is longer than the threshold distance. At 812, determine that the contact is not intentional. The circuitry 202 may determine that the contact between the first player 306 and the object 308 may be not intentional in case the starting point of the movement of the object 308 is shorter than the threshold distance.

Figure 9:
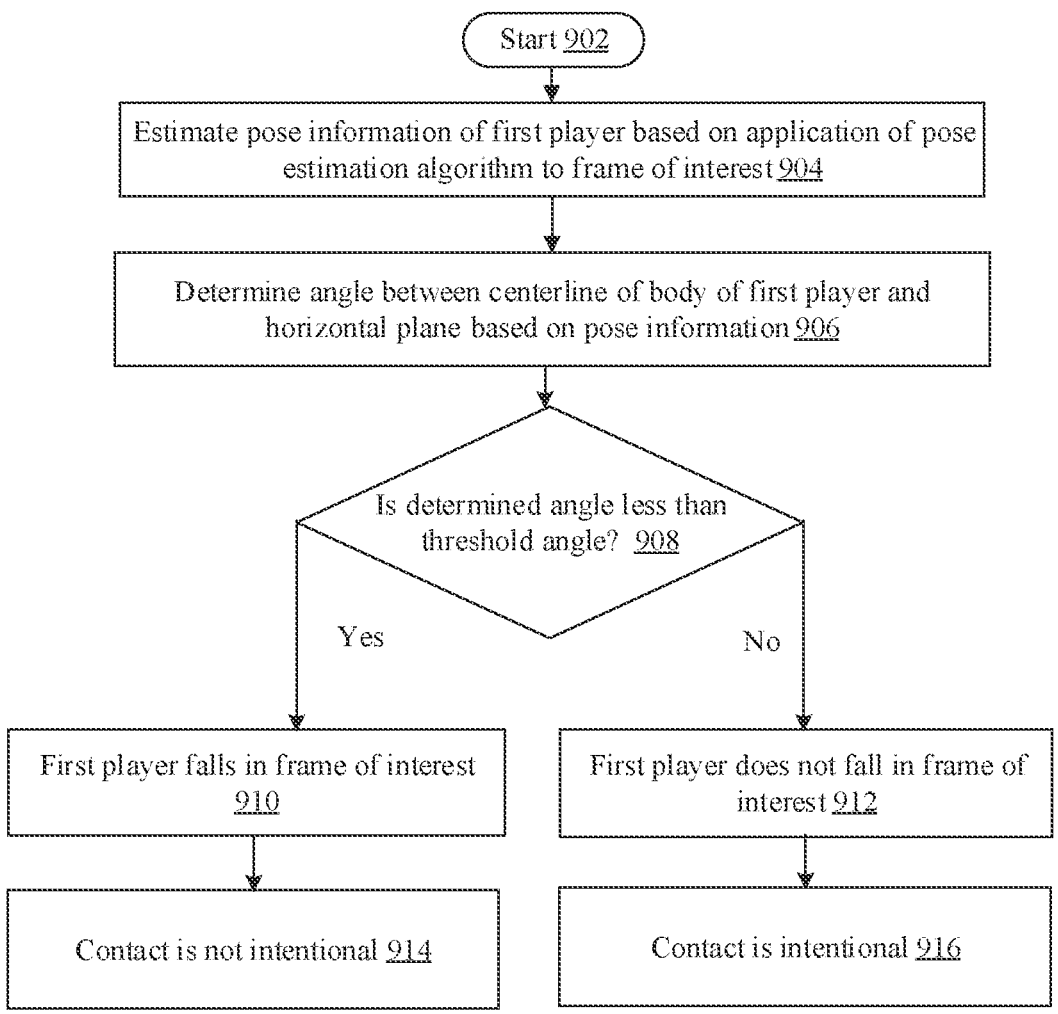
FIG. 9 is a flowchart that illustrates an exemplary method for detection of intentional contact between an object and a body part of a first player based on detection of a fall of the first player by a first detection method, in accordance with an embodiment of the disclosure.

FIG. 9 is a flowchart that illustrates an exemplary method for detection of intentional contact between an object and a body part of a first player based on detection of a fall of the first player by a first detection method, in accordance with an embodiment of the disclosure. FIG. 9 is explained in conjunction with elements from FIGS. 1-8. With reference to FIG. 9, there is shown an exemplary flowchart 900 that illustrates exemplary operations from 902 to 916, as described herein. The operations from 902 to 916 may be executed by any computing system, such as by the electronic device 102, or the circuitry 202. The method may start at 902 and may proceed to 916.

At 904, pose information of the first player 306 may be estimated based on an application of a pose estimation algorithm to the frame of interest 304. In accordance with an embodiment, the circuitry 202 may be configured to estimate the pose information of the first player 306 based on the application of the pose estimation algorithm to the frame of interest 304. The pose information may include, but is not limited to, the skeleton information 516 of the first player 306, a centerline of the body of the first player 306 based on the skeleton information 516, and key points of the skeleton information 516 corresponding to joints of arms and legs, shoulder, hip region, etc. of the first player 306.

At 906, an angle between the centerline of the body of the first player 306 and the horizontal plane (such as the ground) may be determined based on the pose information. The circuitry 202 may determine the angle between the centerline of the body of the first player 306 and the horizontal plane based on the pose information.

At 908, determine whether the angle between the centerline of the body of the first player 306 and the horizontal plane is less than a threshold angle (for example 45 degrees). The circuitry 202 may determine whether the angle between the centerline of the body of the first player 306 and the horizontal plane is less than the threshold angle (for example 45 degrees). Based on the determination that the angle is less than the threshold angle, the control may pass to 910. Otherwise, the control may pass to 912.

At 910, a fall of the first player in the frame of interest 304 may be detected. The circuitry 202 may detect that the first player fell in the frame of interest 304 based on the determination that the angle between the centerline of body of the first player and the horizontal plane is less than the threshold angle (for example 45 degrees). At 912, a fall of the first player in the frame of interest 304 may not be detected. The circuitry 202 may detect that the first player 306 did not fall based on the determination that the angle between the centerline of body of the first player 306 and the horizontal plane is not less than the threshold angle (for example 45 degrees).

At 914, determine that the contact is not intentional. The circuitry 202 may determine that the contact between the first player 306 and the object 308 is not intentional based on the determination that the first player fell to the ground in the frame of interest 304. The circuitry 202 may further determine whether the body part 306A is between a hip region of the first player 306 and the ground based on the skeleton information (such as the skeleton information 516 in FIG. 5) of the first player 306, as described in FIG. 10. For example, the circuitry 202 may determine whether the key points (such as points 3, 4, 6, and 7 in FIG. 5) corresponding to the body part 306A (for example, the lower arm) of the first player 306 are between the key points (such as points 8 or 11 in FIG. 5) corresponding to the hip region of the first player 306 and the horizontal plane (such as the ground). The circuitry 202 may determine that the contact between the first player 306 and the object 308 is unintentional in case the player fell and the body part 306A is between the hip region of the first player 306 and the ground.

At 916, determine that the contact is intentional. The circuitry 202 may determine that the contact between the first player 306 and the object 308 is intentional based on the determination that the first player 306 did not fall to the ground in the frame of interest 304.

Figure 10:
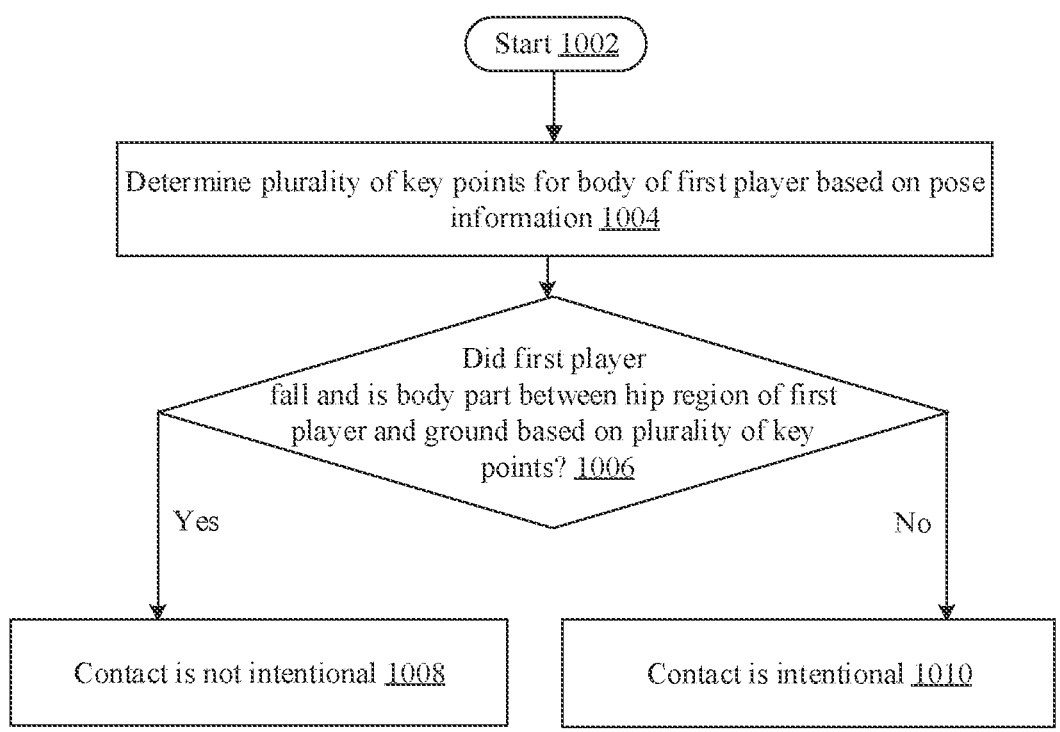
FIG. 10 is a flowchart that illustrates an exemplary method for detection of intentional contact between an object and a body part of a first player based on a position of the body part in a case where the first player fell, in accordance with an embodiment of the disclosure.

FIG. 10 is a flowchart that illustrates an exemplary method for detection of intentional contact between an object and a body part of a first player based on a position of the body part in a case where the first player fell, in accordance with an embodiment of the disclosure. FIG. 10 is explained in conjunction with elements from FIGS. 1-9. With reference to FIG. 10, there is shown an exemplary flowchart 1000 that illustrates exemplary operations from 1002 to 1010, as described herein. The operations from 1002 to 1010 may be executed by any computing system, such as by the electronic device 102, or the circuitry 202. The method may start at 1002 and may proceed to 1010.

At 1004, a plurality of key points (such as the key points 514) of the body of the first player 306 may be determined based on the pose information (such as the skeleton information 516 in FIG. 5). In accordance with an embodiment, the circuitry 202 may be configured to determine the plurality of key points of the body of the first player 306 based on the pose information. The plurality of key points may correspond to joints of arms and legs, shoulder, hip region, etc. of the first player 306.

At 1006, a determination may be made whether the first player 306 falls in the frame of interest 304 and whether the body part 306A (for example the lower arm) is between a hip region of the first player 306 and the ground. Based on the plurality of key points, the circuitry 202 may determine whether the first player 306 falls and whether the body part 306A is between the hip region of the first player 306 and the ground in the frame of interest 304. For example, the circuitry 202 may determine whether the key points (such as points 3 and 4, or 6 and 7 in FIG. 5) corresponding to the body part 306A (for example, the lower arm) of the first player 306 are between the key points (such as points 8 or 11 in FIG. 5) corresponding to the hip region of the first player 306 and the horizontal plane (such as the ground). Based on the determination that the first player 306 fell and that the body part 306A is between the hip region of the first player 306 and the ground, the control may pass to 1008. Otherwise, the control may pass to 1010.

At 1008, determine that the contact is not intentional. The circuitry 202 may determine that the contact between the first player 306 and the object 308 is not intentional based on the determination that the first player 306 fell to the ground and based on the determination that the body part 306A is between the hip region of the first player 306 and the ground when the first player 306 fell. At 1010, determine that the contact is intentional. The circuitry 202 may determine that the contact between the first player 306 and the object 308 is intentional based on the determination that the first player did not fall to the ground in the frame of interest 304.

Figure 11:
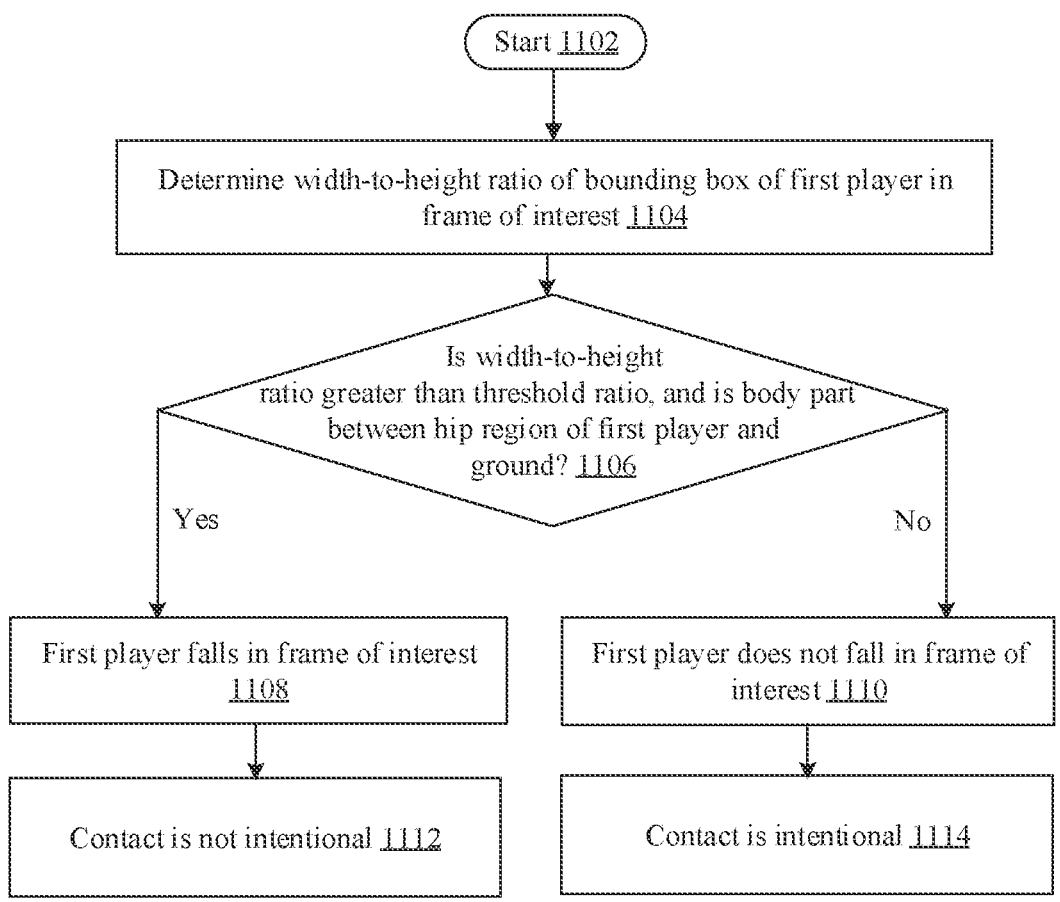
FIG. 11 is a flowchart that illustrates an exemplary method for detection of intentional contact between an object and a body part of a first player based on detection of a fall of the first player by a second detection method, and a position of the body part in a case where the first player fell, in accordance with an embodiment of the disclosure.

FIG. 11 is a flowchart that illustrates an exemplary method for detection of intentional contact between an object and a body part of a first player based on detection of a fall of the first player by a second detection method, and a position of the body part in a case where the first player fell, in accordance with an embodiment of the disclosure. FIG. 11 is explained in conjunction with elements from FIGS. 1-10. With reference to FIG. 11, there is shown an exemplary flowchart 1100 that illustrates exemplary operations from 1102 to 1114, as described herein. The operations from 1102 to 1114 may be executed by any computing system, such as by the electronic device 102, or the circuitry 202. The method may start at 1102 and may proceed to 1114.

At 1104, a width-to-height ratio of a bounding box (such as the bounding box 510) of the first player 306 in the frame of interest 304 may be determined. In accordance with an embodiment, the circuitry 202 may be configured to determine the width-to-height ratio of the bounding box 510 of the first player 306 in the frame of interest 304 based on position coordinates of the bounding box. For example, the circuitry 202 may determine a length of the bounding box 510 of the first player 306 and a width of the bounding box 510 of the first player 306 based on the position coordinates of the corners of the bounding box 510 of the first player 306. The circuitry may further determine width-to-height ratio of the bounding box 510 of the first player 306 based on the length and the width of the bounding box 510 of the first player 306.

At 1106, determine whether the width-to-height ratio of the bounding box 510 of the first player 306 is greater than a threshold ratio, and whether the body part 306A of the first player 306 is between the hip region of the first player 306 and the ground. The circuitry 202 may determine whether the width-to-height ratio of the bounding box 510 is greater than the threshold ratio (for example, 2:1 ratio), and whether the body part 306A of the first player 306 is between the hip region of the first player 306 and the ground in the frame of interest 304. Based on the determination that the width-to-height ratio of the bounding box 510 is greater than the threshold ratio, and that the body part 306A of the first player 306 is between the hip region of the first player 306 and the ground, the control may pass to 1108. Otherwise, the control may pass to 1110.

At 1108, determine that the first player falls in the frame of interest 304. The circuitry 202 may determine that the first player fell to the ground based on the determination that the width-to-height ratio of the bounding box 510 is greater than the threshold ratio (for example, 2:1 ratio), and that the body part 306A of the first player 306 is between the hip region of the first player 306 and the ground. At 1110, determine that the first player does not fall in the frame of interest 304. The circuitry 202 may determine that the first player did not fall to the ground based on the determination the width-to-height ratio of the bounding box 510 is not greater than the threshold ratio (for example, 2:1 ratio).

At 1112, determine that the contact is not intentional. The circuitry 202 may determine that that the contact between the first player 306 and the object 308 is not intentional based on the determination that the first player fell to the ground. At 1114, determine that the contact is intentional. The circuitry 202 may determine that the contact between the first player 306 and the object 308 is intentional based on the determination that the first player did not fall to the ground.

Figure 12:
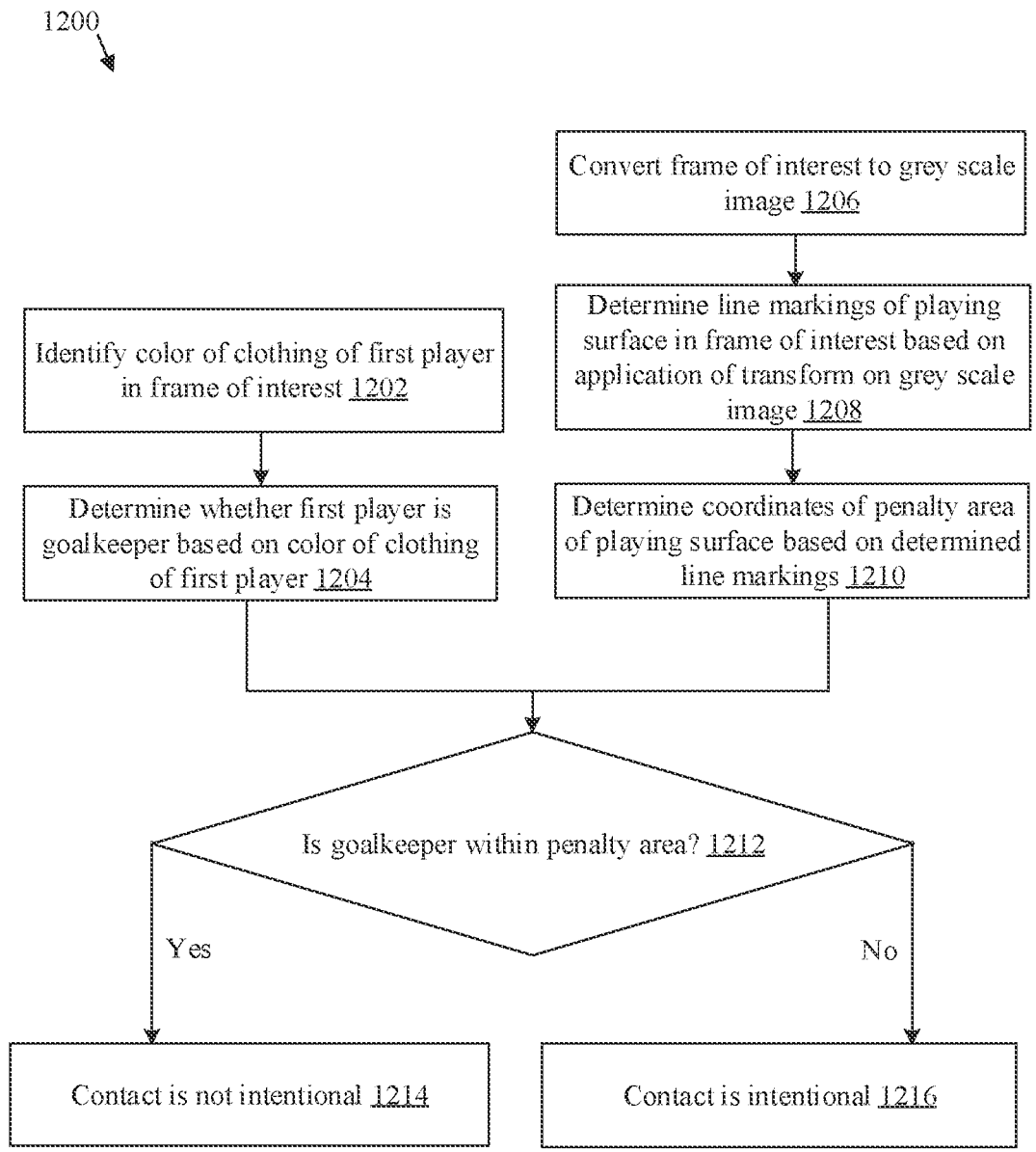
FIG. 12 is a flowchart that illustrates an exemplary method for detection of intentional contact between an object and a body part of a first player based on a determination of a goalkeeper, in accordance with an embodiment of the disclosure.

FIG. 12 is a flowchart that illustrates an exemplary method for detection of intentional contact between an object and a body part of a first player based on a determination of a goalkeeper, in accordance with an embodiment of the disclosure. FIG. 12 is explained in conjunction with elements from FIGS. 1-11. With reference to FIG. 12, there is shown an exemplary flowchart 1200 that illustrates exemplary operations from 1202 to 1216, as described herein. The operations from 1202 to 1216 may be executed by any computing system, such as by the electronic device 102, or the circuitry 202. The method may start at 1202 and may proceed to 1216.

At 1202, a color of clothing of the first player 306 may be identified in the frame of interest 304. The circuitry 202 may identify the color of the clothing of the first player in the frame of interest 304 based on an application of a color classification algorithm on the frame of interest 304.

At 1204, the first player 306 may be determined as a goalkeeper based on the color of the clothing of the first player 306. The circuitry 202 may determine whether the first player 306 is a goalkeeper based on the color of the clothing of the first player 306. The circuitry 202 may compare the color of the clothing of the first player 306 in the frame of interest 304 with information of the color of the clothing of each player (including the goalkeeper) stored in the memory 206. Based on the determination that the color of clothing of the first player 306 is different than the color of clothing of the other players, the circuitry 202 may determine that the first player 306 is a goalkeeper.

At 1206, the frame of interest 304 may be converted to a gray scale image. The circuitry 202 may convert the frame of interest 304 in which the contact is detected to the gray scale image. The circuitry 202 may apply a gray scale image converter on the frame of interest 304 to convert the frame of interest 304 to the gray scale image.

At 1208, line markings of a playing surface in the frame of interest 304 may be determined based on application of a transform on the grey scale image. The circuitry 202 may determine line markings (for example, white line markings) of the playing surface in the frame of interest 304 based on the application of the transform (for example, white top-hat transform) on the grey scale image. For example, the white top-hat transform may output an image containing objects or elements that are brighter than their surroundings. The circuitry 202 may further determine the line markings of the playing surface in the frame of interest 304 based on the output of the white top-hat transform.

At 1210, coordinates of a penalty area (such as the penalty area 310) of the playing surface in the frame of interest 304 may be determined based on the line markings. The circuitry 202 may determine the coordinates of the penalty area 310 of the playing surface in the frame of interest 304 based on the line markings (such as outer line and penalty line) in the gray scale image. For example, the circuitry 202 may determine two parallel lines (such as the outer line and the penalty line) from the line markings and may determine the coordinates of the penalty area 310 based on the determined parallel lines.

At 1212, determine whether the goalkeeper is in the penalty area 310. The circuitry 202 may determine whether the goalkeeper is in the penalty area 310 based on the position coordinates of the first player 306 and the position coordinates of the penalty area 310. For example, the circuitry 202 may compare the position coordinates of a bounding box of the feet of the first player 306 and the position coordinates of the penalty area 310. The circuitry 202 may further determine whether the position coordinates of the bounding box of the feet of the first player 306 overlaps with the position coordinates of the penalty area 310. Based on the determination that the position coordinates of the bounding box of the feet of the first player 306 overlaps within the position coordinates of the penalty area 310, the circuitry 202 may determine that the first player 306 (such as the goalkeeper) is within the penalty area 310. Based on the determination that the goalkeeper is within the penalty area 310, the control may pass to 1214. Otherwise, the control may pass to 1216.

At 1214, determine that the contact is not intentional. The circuitry 202 may determine that the contact between the first player 306 (such as the goalkeeper) and the object 308 (such as the ball) is unintentional based on the determination that the goalkeeper is within the penalty area 310. At 1216, determine that the contact is intentional. The circuitry 202 may determine that the contact between the first player 306 (such as the goalkeeper) and the object 308 is intentional based on the determination that the goalkeeper is not within the penalty area 310.

Figure 13:
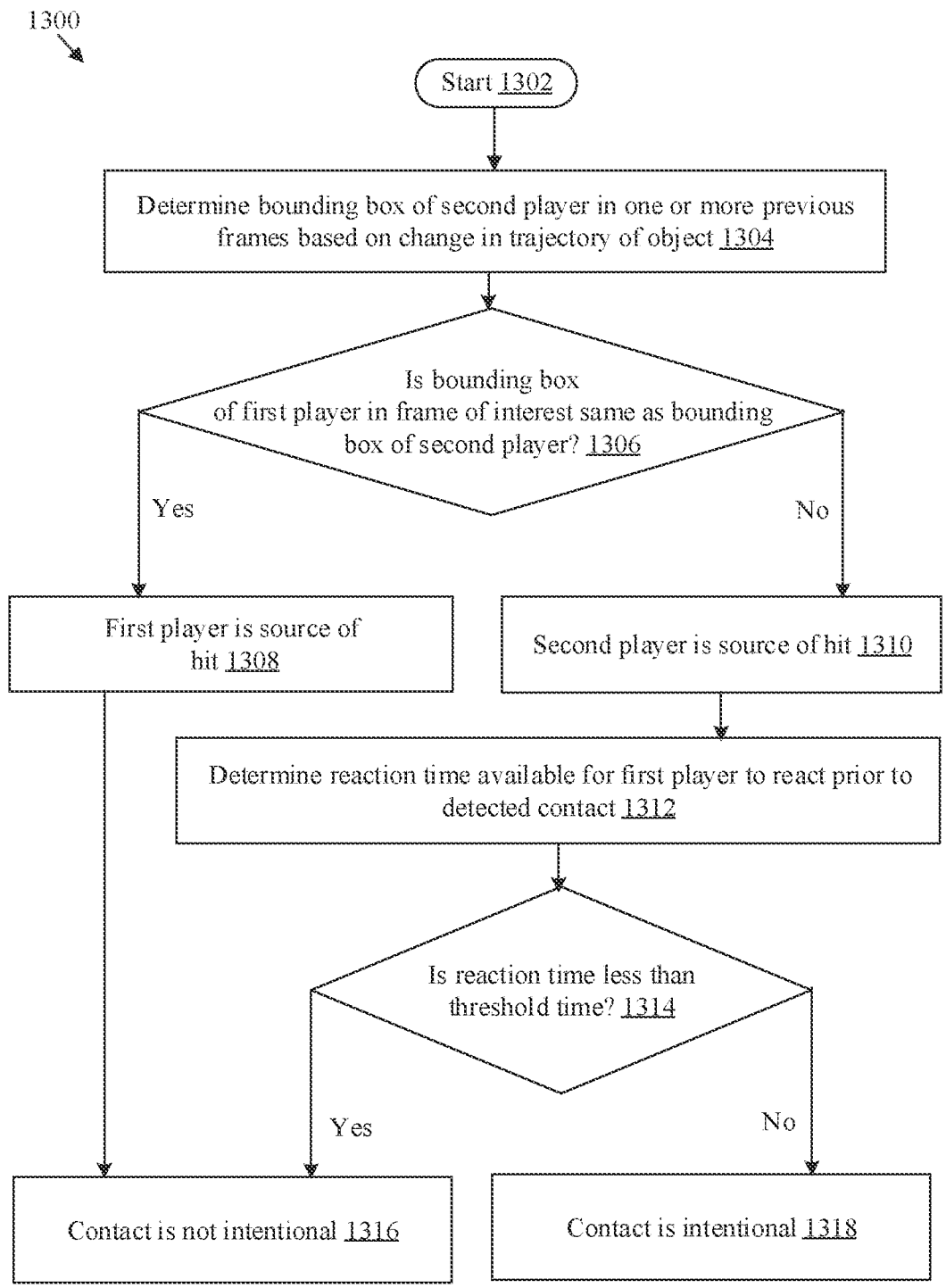
FIG. 13 is a flowchart that illustrates an exemplary method for detection of intentional contact between an object and a body part of a first player based on a reaction time available for the first player, in accordance with an embodiment of the disclosure.

FIG. 13 is a flowchart that illustrates an exemplary method for detection of intentional contact between an object and a body part of a first player based on a reaction time available for the first player, in accordance with an embodiment of the disclosure. FIG. 13 is explained in conjunction with elements from FIGS. 1-12. With reference to FIG. 13, there is shown an exemplary flowchart 1300 that illustrates exemplary operations from 1302 to 1318, as described herein. The operations from 1302 to 1318 may be executed by any computing system, such as by the electronic device 102, or the circuitry 202. The method may start at 1302 and may proceed to 1318.

At 1304, a bounding box of a second player may be determined in one or more previous frames prior to the frame of interest 304 based on a change in trajectory of the object 308. In accordance with an embodiment, the circuitry 202 may be configured to determine the bounding box of the second player in the one or more previous frames where the change in the trajectory of the object 308 has occurred prior to the frame of interest 304.

At 1306, determine whether the bounding box 510 of the first player 306 in the frame of interest 304 is the same as the bounding box of the second player in the one or more previous frames. The circuitry 202 may determine whether the bounding box 510 of the first player 306 in the frame of interest 304 is the same as the bounding box of the second player in the one or more previous frames where the trajectory of the object 308 has changed. Based on the determination that the bounding box 510 of the first player 306 in the frame of interest 304 is the same as the bounding box of the second player in the one or more previous frames, the control may pass to 1308. Otherwise, the control may pass to 1310.

At 1308, the first player 306 may be determined as a source of hit prior to the contact with the object 308. The circuitry 202 may determine that the first player 306 as the source of hit prior to the contact with the object 308 based on the determination that the bounding box 510 of the first player 306 in the frame of interest 304 is the same as the bounding box of the second player in the one or more previous frames. The source of hit may refer to the player who hit the object 308 (such as the ball) from the head or the body (including the foot) of the player prior to the contact of the body part 306A (such as the hand) of the first player 306. The control may pass to 1316.

At 1310, the second player may be determined as the source of hit prior to the contact with the object 308. The circuitry 202 may determine that the second player, different from the first player 306, as the source of hit prior to the contact with the object 308, based on the determination that the bounding box 510 of the first player 306 in the frame of interest 304 is not the same as the bounding box of the second player in the one or more previous frames.

At 1312, a reaction time available for the first player 306 to react prior to the detected contact may be determined. The circuitry 202 may determine the reaction time available for the first player 306 to react prior to the detected contact based on the determination that the second player is the source of hit. For example, the circuitry may calculate the distance between the body part 306A of the first player 306 and the source of hit (such as the body part of the second player). The circuitry 202 may further calculate the speed of the movement of the object 308 (such as the ball) between the first player 306 and the source of hit (such as the body part of the second player) based on a frame rate of the video captured by the imaging device 104. Based on the calculated distance and the calculated speed, the circuitry 202 may determine the reaction time available for the first player to react prior to the detected contact. The circuitry 202 may determine the reaction time based on the frame rate of the video, the frame of interest 304, and the one or more previous frames.

At 1314, determine whether the reaction time is less than a threshold time. The circuitry 202 may determine whether the reaction time is less than the threshold time (for example, one second). Based on the determination that the reaction time is less than the threshold time, the control may pass to 1316. Otherwise, the control may pass to 1318.

At 1316, determine that the contact is not intentional. The circuitry 202 may determine that the contact between first player 306 and the object 308 is unintentional based on the determination that the available reaction time is less than the threshold time. At 1318, determine that the contact is intentional. The circuitry 202 may determine that the contact between first player 306 and the object 308 is intentional based on the determination that the available reaction time is greater than the threshold time.

Figure 14:
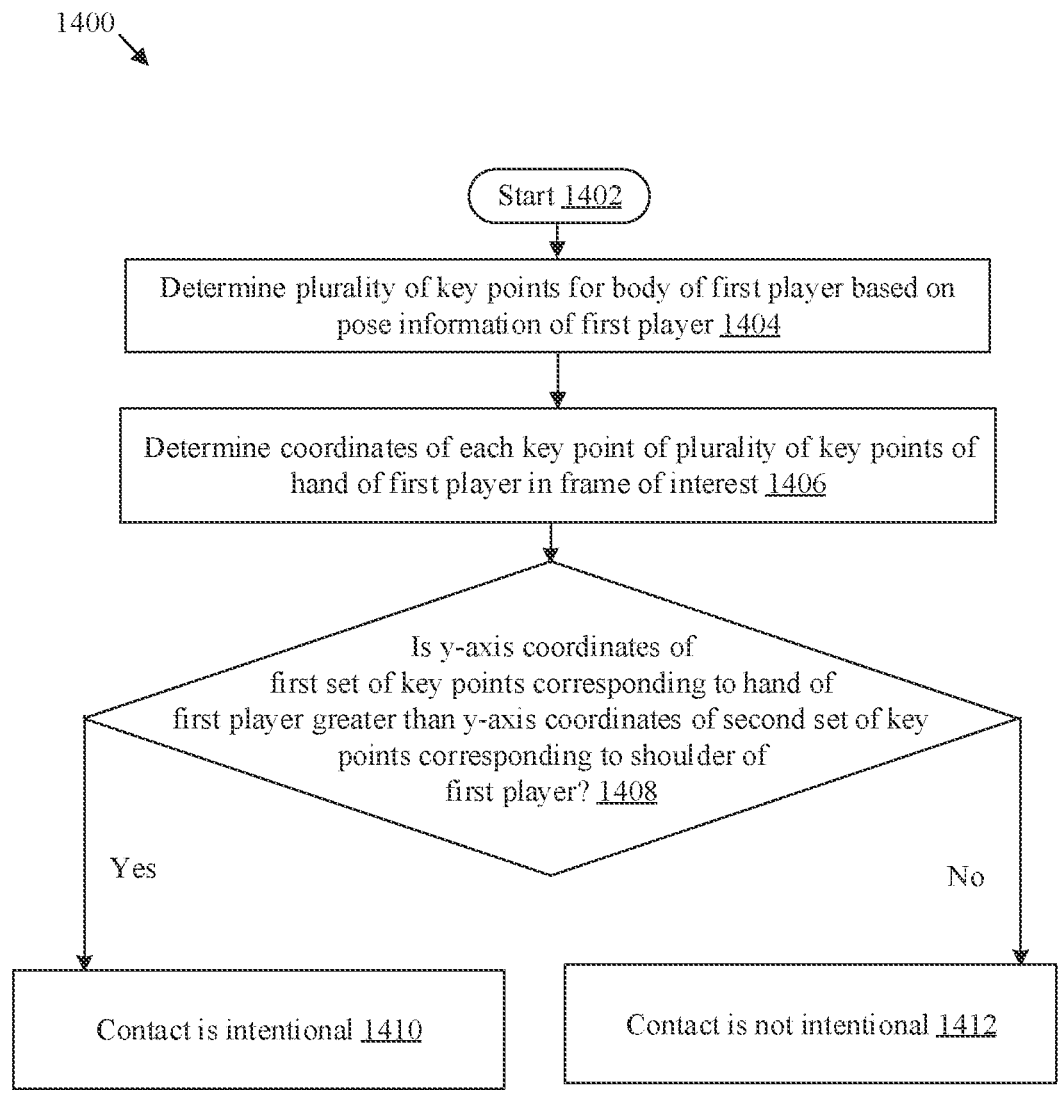
FIG. 14 is a flowchart that illustrates an exemplary method for detection of intentional contact between an object and a body part of a first player based on a position of a lower arm with respect to a collarbone of the first player, in accordance with an embodiment of the disclosure.

FIG. 14 is a flowchart that illustrates an exemplary method for detection of intentional contact between an object and a body part of a first player based on a position of a lower arm with respect to a collarbone of the first player, in accordance with an embodiment of the disclosure. FIG. 14 is explained in conjunction with elements from FIGS. 1-13. With reference to FIG. 14, there is shown an exemplary flowchart 1400 that illustrates exemplary operations from 1402 to 1412, as described herein. The operations from 1402 to 1412 may be executed by any computing system, such as by the electronic device 102, or the circuitry 202. The method may start at 1402 and may proceed to 1412.

At 1404, a plurality of key points (such as key points 514) of the body of the first player 306 may be determined based on pose information of the first player 306. In accordance with an embodiment, the circuitry 202 may be configured to determine the plurality of key points of the body of the first player 306 based on the pose information. The plurality of key points may correspond to joints of arms and legs, shoulder, hip region, etc. of the first player 306.

At 1406, coordinates of each key point of the plurality of key points of the body part 306A (such as the hand) of the first player 306 in the frame of interest 304 may be determined. The circuitry 202 may be configured to determine coordinates of each key point of the plurality of key points of the hand of the first player 306 in the frame of interest 304.

At 1408, determine whether y-axis coordinates of a first set of key points (such as points 3 and 4, or points 6 and 7 in FIG. 5) corresponding to the hand (such as the lower arm) of the first player 306 is greater than y-axis coordinates of second set of key points (such as points 2 or 5 in FIG. 5) corresponding to the shoulder (or collarbone) of the first player 306. The circuitry 202 may determine whether the y-axis coordinates of the first set of key points corresponding to the body part 306A (such as the lower arm) of the first player 306 is greater than the y-axis coordinates of the second set of the key points corresponding to the shoulder of the first player 306. For example, the circuitry 202 may determine whether the hand of the first player 306 is stretched above the shoulder of the first player 306. Based on the determination that the y-axis coordinates of the first set of key points corresponding to the body part 306A of the first player 306 is greater than the y-axis coordinates of the second set of the key points corresponding to the shoulder of the first player 306, the control may pass to 1410. Otherwise, the control may pass to 1412.

At 1410, determine that the contact is intentional. The circuitry 202 may determine that the contact between the first player 306 and the object 308 is intentional, based on the determination that the y-axis coordinates of the first set of key points corresponding to the body part 306A is greater than the y-axis coordinates of the second set of the key points corresponding to the shoulder of the first player 306. In other words, the circuitry 202 may determine that the contact between the first player 306 and the object 308 is intentional, based on the determination that the hand of the first player 306 is stretched above the shoulder of the first player 306. At 1412, determine that the contact is not intentional. The circuitry 202 may determine that the contact between the first player 306 and the object 308 is unintentional, based on the determination that the y-axis coordinates of the first set of key points corresponding to the body part 306A is less than the y-axis coordinates of the second set of the key points corresponding to the shoulder of the first player 306.

Figure 15:
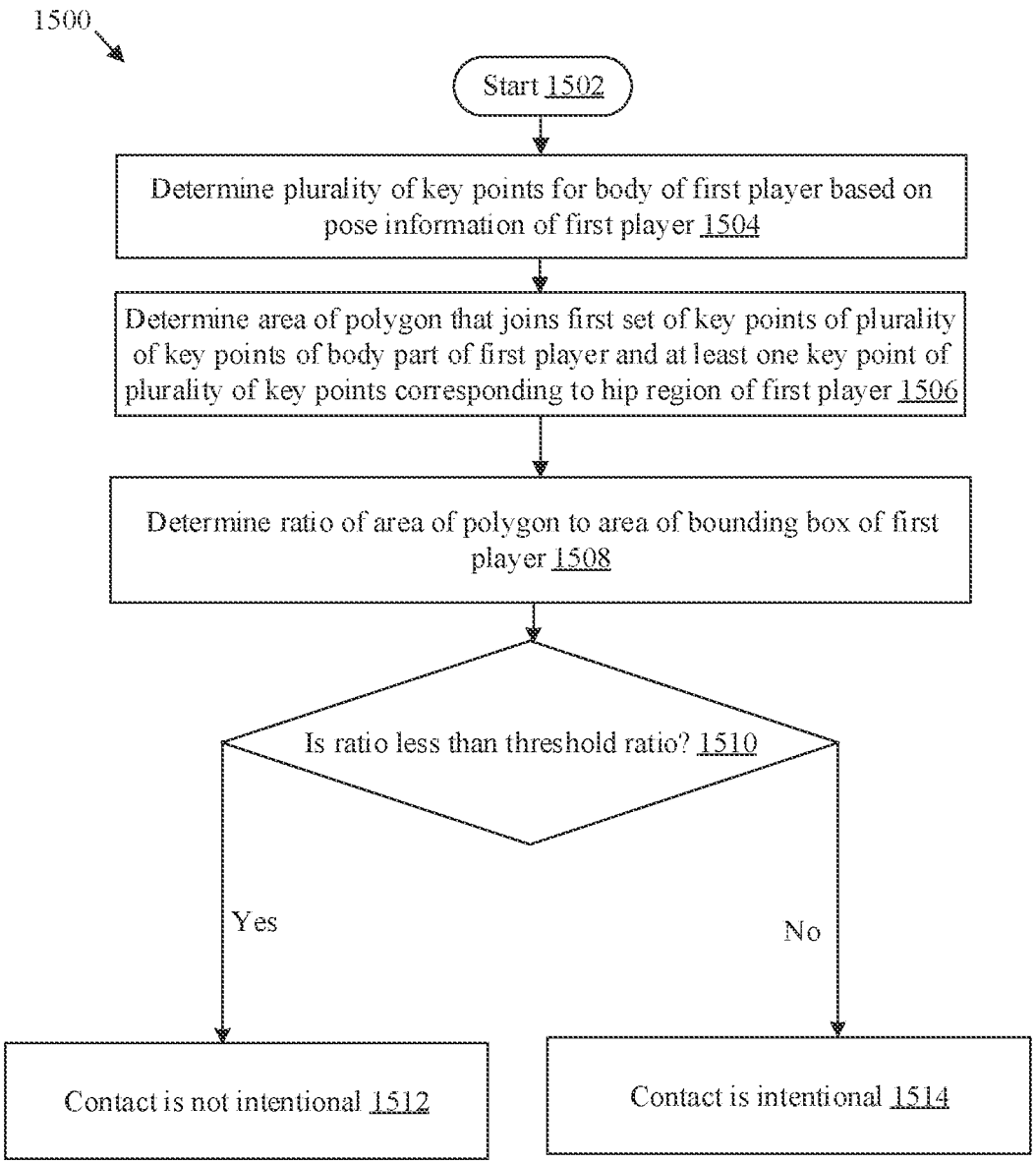
FIG. 15 is a flowchart that illustrates an exemplary method for detection of intentional contact between an object and a body part of a first player based on detection of a body of the first player made unnaturally bigger by extension of arms, in accordance with an embodiment of the disclosure.

FIG. 15 is a flowchart that illustrates an exemplary method for detection of intentional contact between an object and a body part of a first player based on detection of a body of the first player made unnaturally bigger by extension of arms, in accordance with an embodiment of the disclosure. FIG. 15 is explained in conjunction with elements from FIGS. 1-14. With reference to FIG. 15, there is shown an exemplary flowchart 1500 that illustrates exemplary operations from 1502 to 1514, as described herein. The operations from 1502 to 1514 may be executed by any computing system, such as by the electronic device 102, or the circuitry 202. The method may start at 1502 and proceed to 1514.

At 1504, a plurality of key points (such as key points 514 in FIG. 5) of the body of the first player 306 may be determined based on the pose information (such as the skeleton information 516) of the first player 306. In accordance with an embodiment, the circuitry 202 may be configured to determine the plurality of key points of the body of the first player 306 based on the pose information. The plurality of key points may correspond to joints of arms and legs, neck, shoulder, hip region, etc. of the first player 306.

At 1506, an area A1 of a polygon that joins a first set of key points of the plurality of key points corresponding to the body part 306A of the first player 306 and at least one key point of the plurality of key points corresponding to a hip region of the first player 306 may be determined. The circuitry 202 may be configured to determine the area A1 of the polygon that joins the first set of key points (such as points 1, 2, 3, and 4 in FIG. 5) of the plurality of key points corresponding to the neck, shoulder, and the body part 306A of the first player 306 and at least one key point (such as point 8 in FIG. 5) of the plurality of key points corresponding to the hip region of the first player 306. In another embodiment, the circuitry 202 may be configured to determine the area A1 of the polygon that joins the first set of key points (such as points 1, 5, 6, and 7 in FIG. 5) of the plurality of key points corresponding to the neck, the shoulder, and the body part 306A of the first player 306 and at least one key point (such as point 11 in FIG. 5) of the plurality of key points corresponding to the hip region of the first player 306. The polygon may include the points 1, 2, 3, 4, and 8 or the points 1, 5, 6, 7, and 11 shown in FIG. 5. The circuitry 202 may further determine an area A2 of the bounding box 510 of the first player 306 in the frame of interest 304 where the handball event occurred.

At 1508, a ratio of the area A1 of the polygon to the area A2 of the bounding box 510 of the first player 306 may be determined. The circuitry 202 may determine the ratio of the area A1 of the polygon to the area A2 of the bounding box 510 of the first player 306.

At 1510, determine whether the ratio of the area A1 of the polygon to the area A2 of the bounding box 510 of the first player 306 is less than a threshold ratio. The circuitry 202 may determine whether the ratio of the area A1 of the polygon to the area A2 of the bounding box 510 is less than the threshold ratio (for example 0.1). For example, the circuitry 202 may determine whether the body of the first player 306 is made unnaturally bigger by extension of arms of the first player 306. Based on the determination that the ratio of the area A1 of the polygon to the area A2 of the bounding box 510 is less than the threshold ratio, the control may pass to 1512. Otherwise, the control may pass to 1514.

At 1512, determine that the contact is not intentional. The circuitry 202 may determine that the contact between the first player 306 and the object 308 is not intentional based on the determination that the ratio of the area A1 to the area A2 is less than the threshold ratio. In case the ratio is less than the threshold ratio, the circuitry 202 may determine that the body of the first player 306 was not made unnaturally bigger by extension of arms of the first player 306 in case the ratio of the area A1 to the area A2 is less than the threshold ratio, and thereby may determine that the contact between the first player 306 and the object 308 is unintentional. At 1514, determine that the contact is intentional. The circuitry 202 may determine that the contact between the first player 306 and the object 308 is intentional based on the determination that the ratio of the area A1 to the area A2 is greater than the threshold ratio. For example, the circuitry 202 may determine that the body of the first player 306 was made unnaturally bigger by extension of arms of the first player 306 in case the ratio of the area A1 to the area A2 is greater than the threshold ratio, and thereby may determine that the contact between the first player 306 and the object 308 is intentional.

Figure 16:
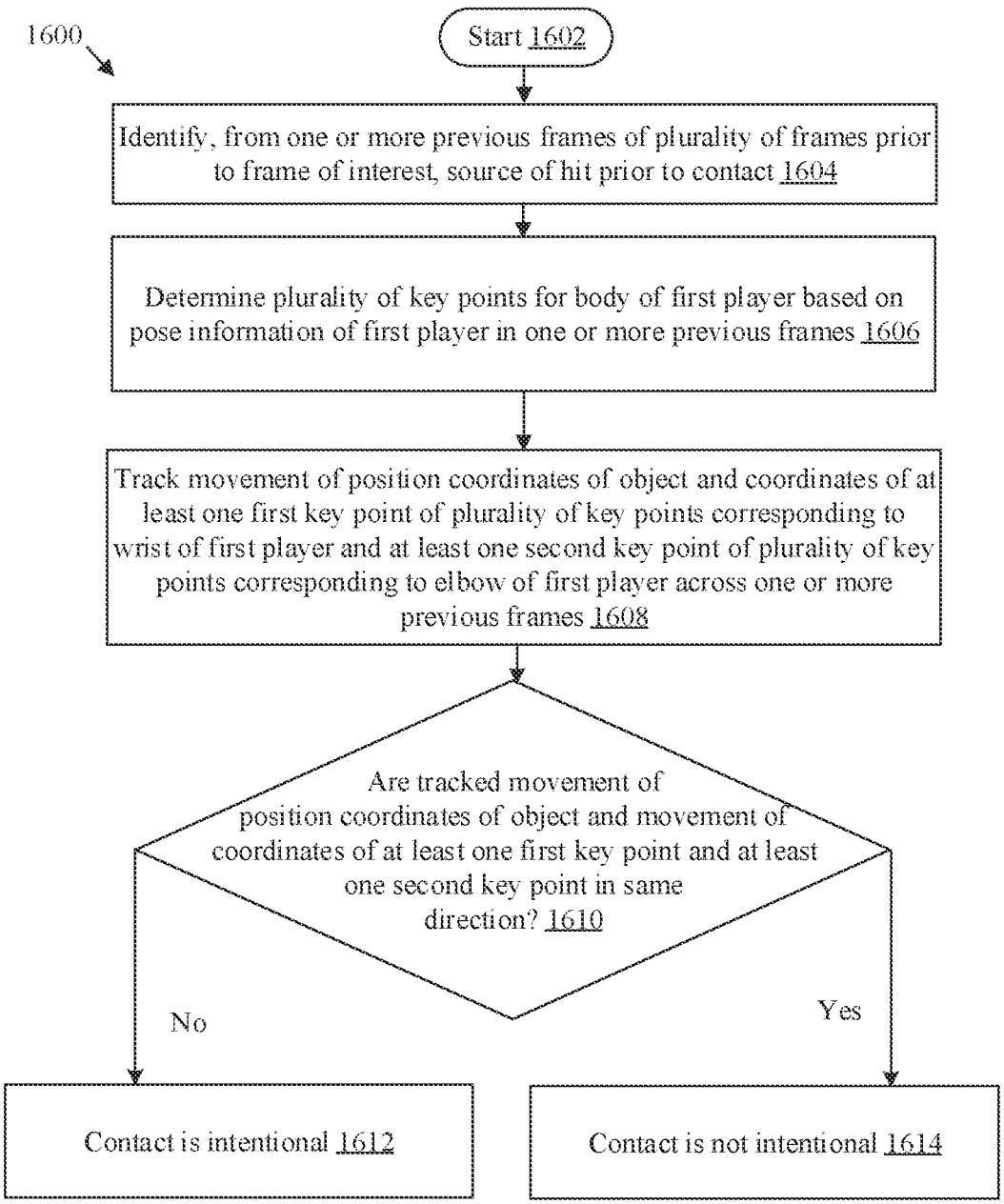
FIG. 16 is a flowchart that illustrates an exemplary method for detection of intentional contact between an object and a body part of a first player based on determination whether the body part moves toward the object, in accordance with an embodiment of the disclosure.

FIG. 16 is a flowchart that illustrates an exemplary method for detection of intentional contact between an object and a body part of a first player based on determination whether the body part moves toward the object, in accordance with an embodiment of the disclosure. FIG. 16 is explained in conjunction with elements from FIGS. 1-15. With reference to FIG. 16, there is shown an exemplary flowchart 1600 that illustrates exemplary operations from 1602 to 1614, as described herein. The operations from 1602 to 1614 may be executed by any computing system, such as by the electronic device 102, or the circuitry 202. The method may start at 1602 and may proceed to 1614.

At 1604, a source of hit prior to the contact between the body part 306A of the first player 306 and the object 308 (such as the ball) may be identified from one or more previous frames of the plurality of frames 402 prior to the frame of interest 304. In accordance with an embodiment, the circuitry 202 may be configured to identify, from one or more previous frames of the plurality of frames 402 prior to the frame of interest 304, a source of hit prior to the contact between the body part 306A of the first player 306 and the object 308.

At 1606, a plurality of key points (such as key points 514 in FIG. 5) of the body of the first player 306 may be determined based on the pose information (such as the skeleton information 516) of the first player 306. In accordance with an embodiment, the circuitry 202 may be configured to determine the plurality of key points of the body of the first player 306 based on the pose information. The plurality of key points may correspond to joints of arms and legs, shoulder, hip region, etc. of the first player 306.

At 1608, a movement of the position coordinates of the object 308 (for example, the position coordinates of the center of the ball) and position coordinates of at least one first key point of the plurality of key points corresponding to a wrist of the first player 306 and at least one second key point of the plurality of key points corresponding to an elbow of the first player 306 may be tracked across the one or more previous frames. The circuitry 202 may be configured to track movement of the position coordinates of the object 308 (for example, the position coordinates of the center of the ball) and position coordinates of at least one first key point (for example, points 4 or 7 in FIG. 5) of the plurality of key points corresponding to a wrist of the first player 306 and at least one second key point (for example, points 3 or 6 in FIG. 5) of the plurality of key points corresponding to an elbow of the first player 306 across the one or more previous frames.

At 1610, determine whether the tracked movement of the position coordinates of the center of the object 308 and the tracked movement of the position coordinates of the at least one first key point corresponding to the wrist of the first player 306 and the at least one second key point corresponding to the elbow of the first player 306 are in the same direction. For example, the circuitry 202 may compare the progression of the position coordinates of the center of the object 308 and the progression of the position coordinates of the at least one first key point and the at least one second key point across the one or more previous frames prior to the contact. The circuitry 202 may be configured to determine whether the tracked movement of the position coordinates of the center of the object 308 and the tracked movement of the position coordinates of the at least one first key point corresponding to the wrist of the first player 306 and the at least one second key point corresponding to the elbow of the first player 306 are in the same direction, based on the comparison.

At 1612, determine that the contact is intentional. The circuitry 202 may determine that the contact between the body part 306A (such as the hand) of the first player 306 and the object 308 is intentional based on the determination that the tracked movement of the position coordinates of the center of the object 308 and the tracked movement of the position coordinates of the at least one first key point corresponding to the wrist of the first player 306 and the at least one second key point corresponding to the elbow of the first player 306 are not in the same direction. In a case where the tracked movement of the position coordinates of the center of the object 308 and the tracked movement of the position coordinates of the at least one first key point and the at least one second key point are not in the same direction, the circuitry 202 may determine that the body part 306A (such as the hand) moved toward the object 308 (such as the ball) prior to the contact with the object 308, and thereby may determine the contact between the body part 306A of the first player 306 and the object 308 is intentional.

At 1614, determine that the contact is not intentional. The circuitry 202 may determine that the contact between the body part 306A of the first player 306 and the object 308 is unintentional based on the determination that the tracked movement of the position coordinates of the center of the object 308 and the tracked movement of the position coordinates of the at least one first key point corresponding to the wrist of the first player 306 and the at least one second key point corresponding to the elbow of the first player 306 are in the same direction. In a case where the tracked movement of the position coordinates of the center of the object 308 and the tracked movement of the position coordinates of the at least one first key point and the at least one second key point are in the same direction, the circuitry 202 may determine that the body part 306A (such as the hand) moved away from the object 308 (such as the ball) prior to the contact with the object 308, and thereby may determine the contact between the body part 306A of the first player 306 and the object 308 is not intentional.

Figure 17:
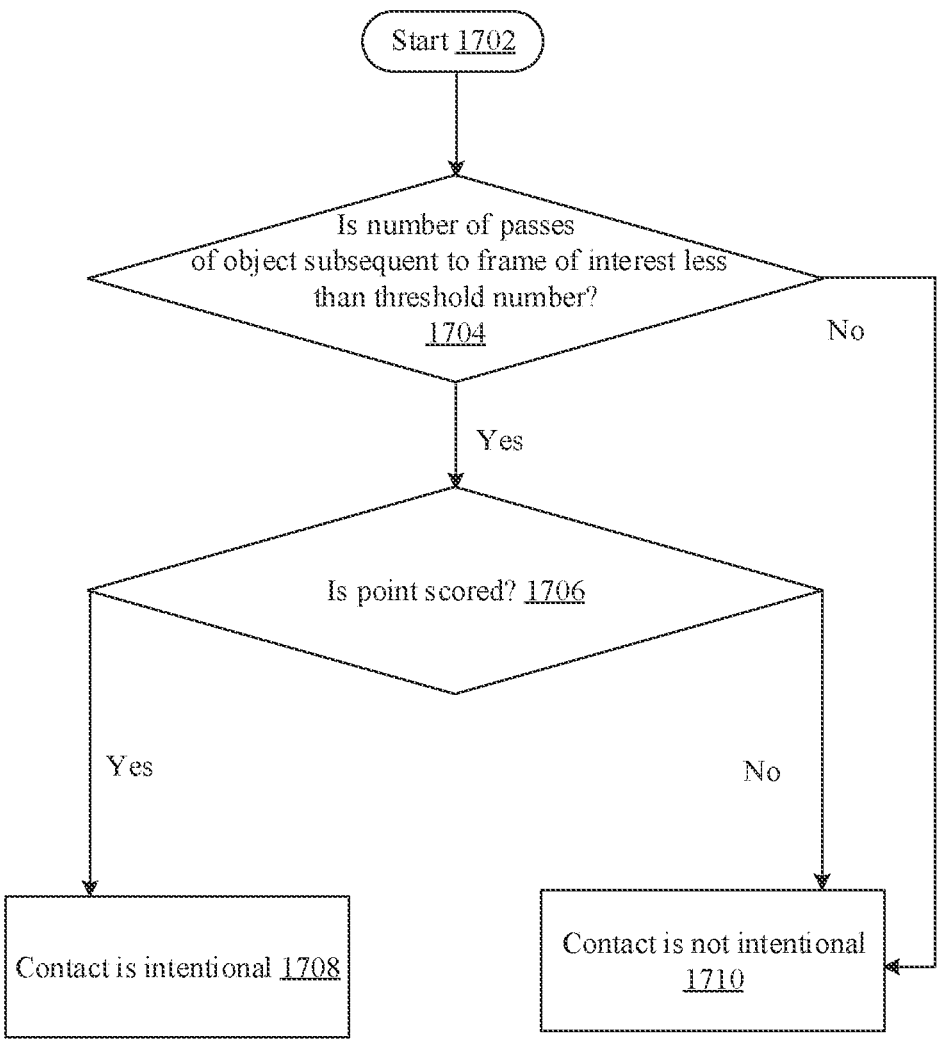
FIG. 17 is a flowchart that illustrates an exemplary method for detection of intentional contact between an object and a body part of a first player based on determination whether a point is scored subsequent to the contact, in accordance with an embodiment of the disclosure.

FIG. 17 is a flowchart that illustrates an exemplary method for detection of intentional contact between an object and a body part of a first player based on determination whether a point is scored subsequent to the contact, in accordance with an embodiment of the disclosure. FIG. 17 is explained in conjunction with elements from FIGS. 1-16. With reference to FIG. 17, there is shown an exemplary flowchart 1700 that illustrates exemplary operations from 1702 to 1710, as described herein. The operations from 1702 to 1710 may be executed by any computing system, such as by the electronic device 102, or the circuitry 202. The method may start at 1702 and may proceed to 1710.

At 1704, determine whether a number of passes of the object 308 (such as the ball) subsequent to the frame of interest 304 is less than a threshold number (for example, three). In accordance with an embodiment, the circuitry 202 may be configured to count the number of passes subsequent to the frame of interest 304 where contact with the object 308 is detected. The circuitry 202 may determine whether the number of passes of the object 308, subsequent to the frame of interest 304, is less that the threshold number. Based on the determination that the number of passes of the object 308 subsequent to the frame of interest 304 is less that the threshold number, the control may pass to 1706. Based on the determination that the number of passes of the object 308 subsequent to the frame of interest 304 is greater that the threshold number, the control may pass to 1710.

At 1706, determine whether a point (for example, a goal) is scored in a case where the number of passes of the object 308 is less than the threshold number. In accordance with an embodiment, the circuitry 202 may be configured to determine whether the point is scored in a case where the number of passes of the object 308 subsequent to the frame of interest 304 is less than the threshold number. For example, the circuitry 202 may determine whether a goal is scored based on goal-line technology which may use one or more sensors in the goal frame or cameras to track the object 308 (such as the ball). Based on the determination that the point is scored in a case where the number of passes of the object 308 is less than the threshold number, the control may pass to 1708. Otherwise, the control may pass to 1710.

At 1708, determine that the contact is intentional. The circuitry 202 may determine that the contact between the first player 306 and the object 308 is intentional based on the determination that the point is scored in the case where the number of passes of the object 308 (such as the ball) is less than the threshold number (for example, three). At 1710, determine that the contact is not intentional. The circuitry 202 may determine that the contact between the first player 306 and the object 308 is unintentional based on the determination that the point is scored in the case where the number of passes of the object 308 is greater than the threshold number.

Figure 18:
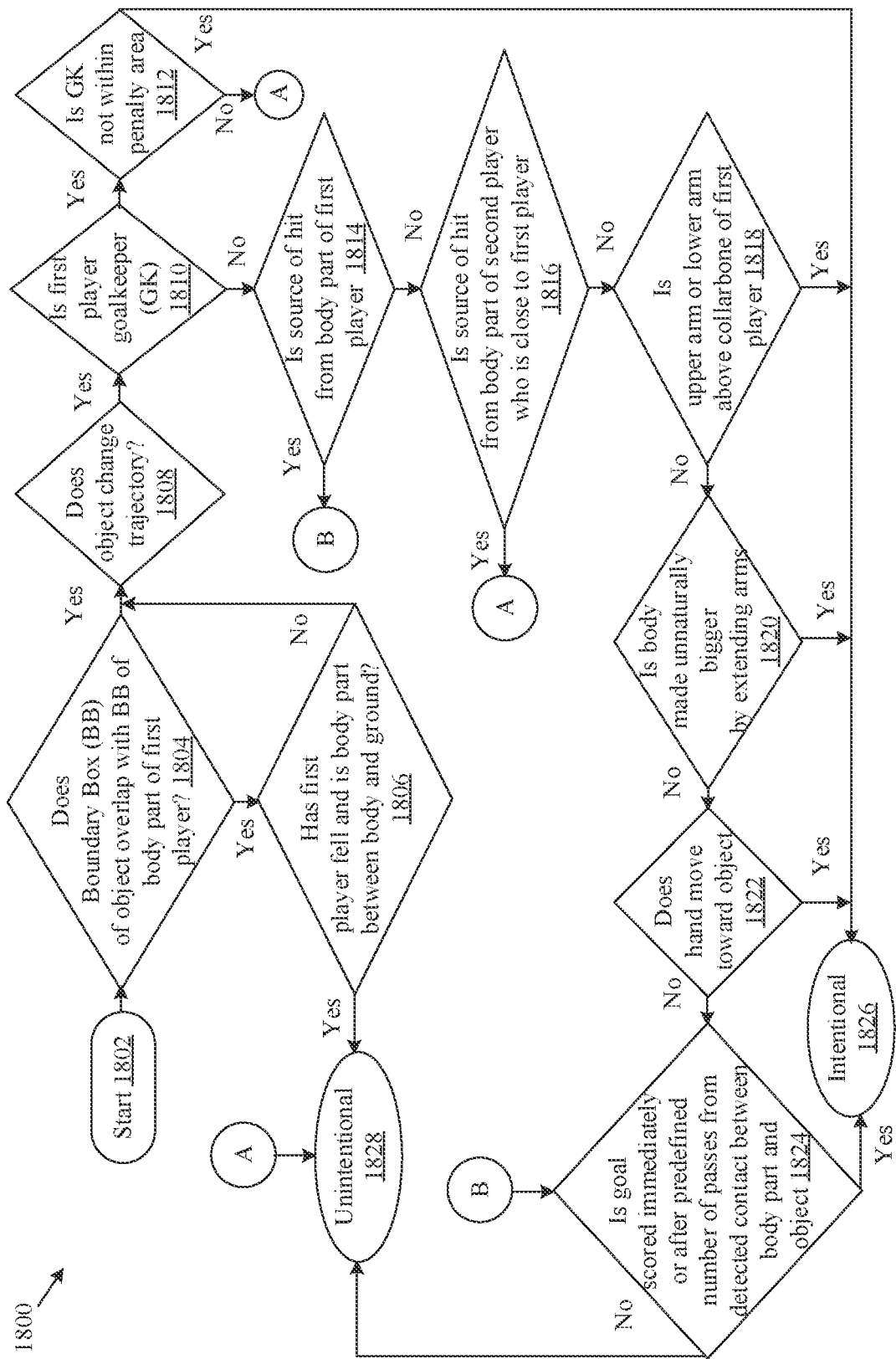
FIG. 18 is a flowchart that illustrates an exemplary method for detection of intentional contact between an object and a body part of a first player in a sport using a machine learning model based a plurality of determining factors, in accordance with an embodiment of the disclosure.

FIG. 18 is a flowchart that illustrates an exemplary method for detection of intentional contact between an object and a body part of a first player in a sport using a machine learning model based a plurality of determining factors, in accordance with an embodiment of the disclosure.

FIG. 18 is explained in conjunction with elements from FIGS. 1-17. With reference to FIG. 18, there is shown an exemplary flowchart 1800 that illustrates exemplary operations from 1802 to 1828, as described herein. The operations from 1802 to 1828 may be executed by any computing system, such as by the electronic device 102, or the circuitry 202. The method may start at 1802 and may proceed to 1828. The plurality of determining factors may be in compliance with the rules defined by the governing authority of the sport.

At 1804, the circuitry 202 may determine whether the bounding box 512 of the object 308 overlaps with the bounding box 510A of the body part 306A (such as the hand) of the first player 306. If yes, the control may pass to 1808 via check 1806. Details of the determination of whether the bounding box 512 of the object 308 overlaps the bounding box 510A of the body part 306A of the first player 306 are further described, for example, in FIG. 7.

At 1806, the circuitry 202 may determine whether the first player fell to the ground and whether the body part 306A of the first player 306 is between the body of the first player 306 and the ground. If yes, the control may pass to 1828. Otherwise, the control may pass to 1808. Details of the determination of whether the first player fell to the ground and whether the body part 306A of the first player 306 is between the body of the first player 306 and the ground are further described, for example, in FIG. 9-11.

At 1808, the circuitry 202 may determine whether the object 308 changes its trajectory subsequent to the frame of interest 304. If yes, the control may pass to 1810. Details of the determination whether the object 308 changes its trajectory are further described, for example, in FIG. 6.

At 1810, the circuitry 202 may determine whether the first player is a goalkeeper. If yes, the control may pass to 1812. Otherwise, the control may pass to 1814. Details of the determination whether the first player is a goalkeeper are further described, for example, in FIG. 12.

At 1812, the circuitry 202 may determine whether the goalkeeper is not within the penalty area 310. If yes, the control may pass to 1826. Otherwise, the control may pass to 1828. Details of the determination whether the goalkeeper is not within the penalty area 310 are further described, for example, in FIG. 12.

At 1814, the circuitry 202 may determine whether the source of hit prior to the contact is the body (including head or foot) of the first player 306. If yes, the control may pass to 1824. Otherwise, the control may pass to 1816. Details of the determination whether the source of hit is from the body part 306A of the first player 306 are further described, for example, in FIG. 13.

At 1816, the circuitry 202 may determine whether the source of hit is the body part (including head or foot) of a second player who is close to the first player 306. If yes, the control may pass to 1828. Otherwise, the control may pass to 1818. Details of the determination of whether the source of hit is from the body part of the second player are further described, for example, in FIG. 13.

At 1818, the circuitry 202 may determine whether the upper arm or the lower arm of the first player 306 is stretched above the collarbone or shoulder of the first player 306. If yes, the control may pass to 1826. Otherwise, the control may pass to 1820. Details of the determination of whether the upper arm or the lower arm of the first player 306 is stretched above the shoulder of the first player 306 are further described, for example, in FIG. 14.

At 1820, the circuitry 202 may determine whether the body of the first player 306 has been made unnaturally bigger by extension of arms of the first player 306. If yes, the control may pass to 1826. Otherwise, the control may pass to 1822. Details of the determination whether the upper arm or the lower arm is above collarbone of the first player are further described, for example, in FIG. 15.

At 1822, the circuitry 202 may determine whether the body part 306A (such as the hand) of the first player 306 moves toward the object 308. If yes, the control may pass to 1826. Otherwise, the control may pass to 1824. Details of the determination whether the first player moves the body part 306A toward the object 308 are further described, for example, in FIG. 16.

At 1824, the circuitry 202 may determine whether the goal is scored immediately or after a predefined number of passes (such as 2-3 passes) from the detected contact between the object 308 and the body part 306A of the first player 306. If yes, the control may pass to 1826. Otherwise, the control may pass to 1828. Details of the determination of whether the goal is scored subsequent to the contact between the object 308 and the body part 306A of the first player 306 are further described, for example, in FIG. 17.

At 1826, determine that the contact is intentional. The circuitry 202 may determine that the contact between the body part 306A of the first player 306 and the object 308 is intentional. At 1826, determine that the contact is not intentional. The circuitry 202 may determine that the contact between the body part 306A of the first player 306 and the object 308 is unintentional.

Although the flowchart 1800 is illustrated as discrete operations, such as 1802 to 1828, the disclosure is not so limited. Accordingly, in certain embodiments, such discrete operations may be replaced with other operations, divided into additional operations, combined into fewer operations, or eliminated, depending on the particular implementation and changing rules of the sport without detracting from the essence of the disclosed embodiments.

Figure 19:
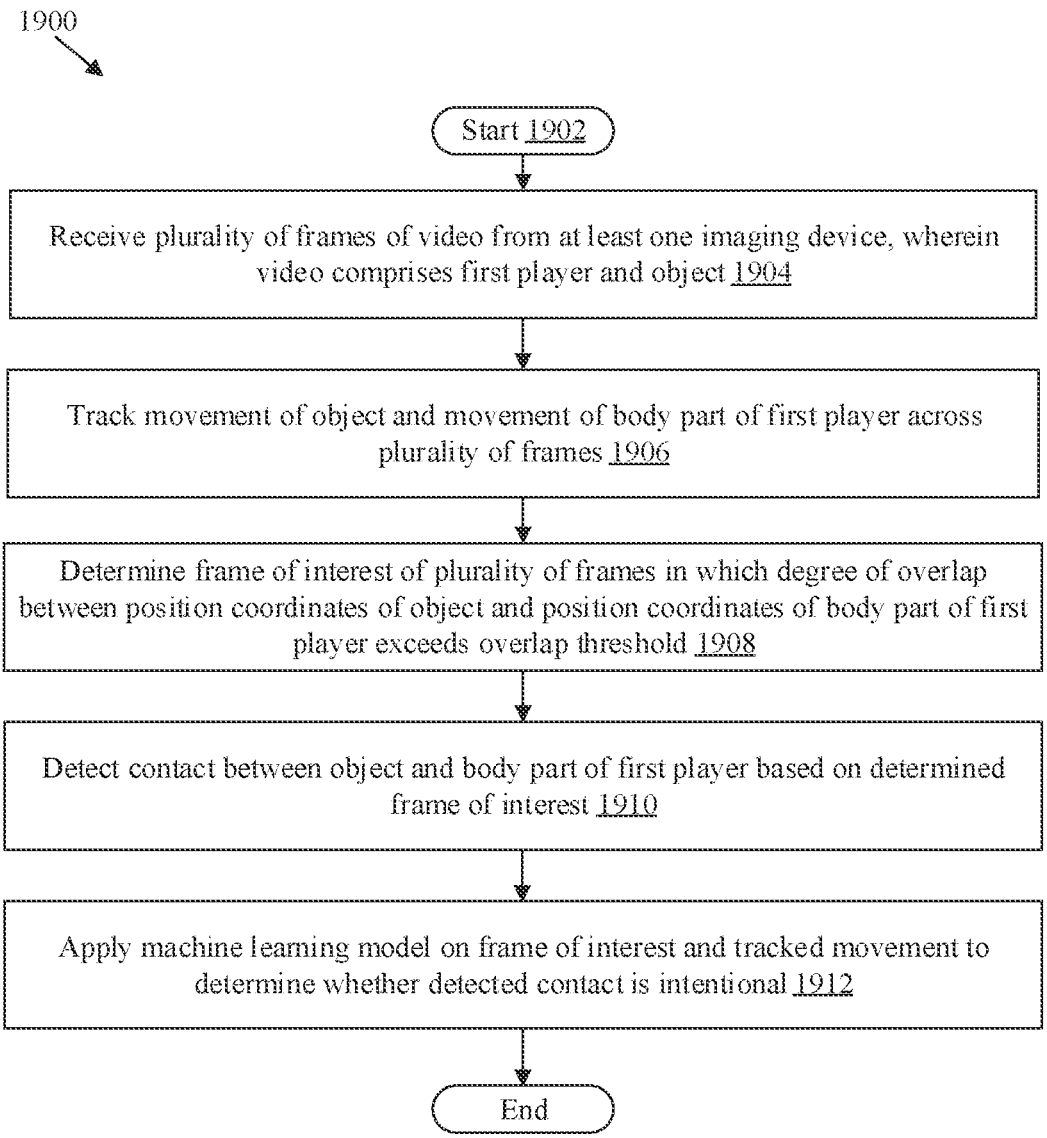
FIG. 19 is a flowchart that illustrates an exemplary method for detection of intentional contact between an object and a body part of a first player in a sport using a machine learning model, in accordance with an embodiment of the disclosure.

FIG. 19 is a flowchart that illustrates an exemplary method for detection of intentional contact between an object and a body part of a first player in a sport using a machine learning model, in accordance with an embodiment of the disclosure. FIG. 19 is explained in conjunction with elements from FIGS. 1-18. With reference to FIG. 19, there is shown a flowchart 1900 that illustrates exemplary operations from 1902 to 1912, as described herein. The operations from 1902 to 1912 may be executed by any computing system, such as by the electronic device 102, or the circuitry 202. The method may start at 1902 and may proceed to 1912.

At 1904, the plurality of frames 402 of a video may be received from the imaging device 104, wherein the video comprises the first player 306 and the object 308. In accordance with an embodiment, the circuitry 202 may be configured to receive the plurality of frames 402 of the video from the imaging device 104. Details of the execution of the reception of the plurality of frames 402 of the video are provided, for example, in FIGS. 1-3.

At 1906, the movement of the object 308 and the movement of the body part 306A of the first player 306 may be tracked across the plurality of frames. In accordance with an embodiment, the circuitry 202 may be configured to track the movement of the object 308 and the movement of the body part 306A of the first player 306 across the plurality of frames 402. Details of the tracking of the movement of the object 308 and the movement of the body part 306A of the first player 306 are provided, for example, in FIGS. 1, 5, and 6.

At 1908, the frame of interest 304, of the plurality of frames 402, in which a degree of overlap between position coordinates of the object 308 and position coordinates of the body part 306A of the first player 306 exceeds that overlap threshold may be determined. In accordance with an embodiment, the circuitry 202 may be configured to determine the frame of interest 304 in which degree of overlap between position coordinates of the object 308 and position coordinates of the body part 306A of the first player 306 exceeds that overlap threshold. Details of the determination of the frame of interest 304 are provided, for example, in FIGS. 1, 3, and 7.

At 1910, the contact between the object 308 and the body part 306A of the first player 306 may be detected based on the determined frame of interest 304. In accordance with an embodiment, the circuitry 202 may detect the contact between the object 308 and the body part 306A of the first player 306 based on the frame of interest 304. Details of the detection of the contact between the object 308 and the body part 306A of the first player 306 are provided, for example, in FIGS. 1, 3, 6, and 7.

At 1912, a machine learning (ML) model 112 may be applied on the frame of interest 304 and the tracked movement to determine whether the contact is intentional. In accordance with an embodiment, the circuitry 202 may apply the ML model 112 on the frame of interest 304 and the tracked movement to determine whether the contact is intentional. Details of the application of the ML model 112 are provided, for example, in FIGS. 1, 4, 5, and 18.

Although the flowchart 1900 is illustrated as discrete operations, such as 1902, 1904, 1906, 1908, 1910, and 1912, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium and/or storage medium having stored thereon, instructions executable by a machine and/or a computer to operate a system (such as the electronic device 102 or the circuitry 202) for detection of whether a contact between an object and a body part of a player is intentional using a machine learning model. The instructions may cause the machine and/or computer to perform operations that may include receiving a plurality of frames 402 of a video from the imaging device 104, wherein the video comprises a first player 306 and an object 308. The operations may further include tracking a movement of the object 308 and a movement of a body part 306A of the first player 306 across the plurality of frames 402. The operations may further include determining a frame of interest 304 of the plurality of frames 402 in which a degree of overlap between position coordinates of the object 308 and position coordinates of the body part 306A of the first player 306 exceeds an overlap threshold, wherein the determination of the frame of interest 304 is based on the tracked movement. The operations may further include detecting a contact between the object 308 and the body part 306A of the first player 306 based on the determined frame of interest 304. The operations may further include applying the machine learning (ML) model 112 on the frame of interest 304 and the tracked movement to determine whether the contact is intentional.

Various embodiments of the disclosure may provide an electronic device (such as the electronic device 102) for detection of intentional contact of an object (such as the object 308) with a body part (such as the body part 306A) of a first player (such as the first player 306) in a sport using a machine learning (ML) model (such as the ML model 112). The electronic device 102 may include circuitry (such as the circuitry 202) that is communicatively coupled to an imaging device (such as the imaging device 104) and a server (such as the server 106). The circuitry 202 may be configured to receive a plurality of frames (such as the plurality of frames 402) of a video from the imaging device 104. The video may include the first player 306 and the object 308. The circuitry 202 may track a movement of the object 308 and a movement of a body part 306A of the first player 306 across the plurality of frames 402. The circuitry 202 may further determine, based on the tracked movement, a frame of interest (such as the frame of interest 304) from the plurality of frames 402 in which the degree of overlap between position coordinates of the object 308 and position coordinates of the body part 306A of the first player 306 exceeds an overlap threshold. The circuitry 202 may detect a contact between the object 308 and the body part 306A of the first player 306 based on the determined frame of interest 304. The circuitry 202 may apply the ML model 112 on the frame of interest 304 and the tracked movement to determine whether the detected contact is intentional.

In accordance with an embodiment, the circuitry 202 may output a first notification based on the determination that the detected contact is intentional. The circuitry 202 may output a second notification based on the determination that the detected contact is unintentional.

In accordance with an embodiment, the circuitry 202 may determine a trajectory of the movement of the object 308 in one or more previous frames of the plurality of frames 402 prior to the frame of interest 304. The circuitry 202 may predict, based on the trajectory of the movement, the position coordinates of the object 308 in one or more subsequent frames of the plurality of frames 402 subsequent to the frame of interest 304. The circuitry 202 may determine a change in the trajectory of the object 308 in the one or more subsequent frames based on a difference between the predicted position coordinates and actual coordinates of the object in the one or more subsequent frames that exceeds a threshold range. The circuitry 202 may detect the contact between the object 308 and the body part 306A of the first player 306 based on the determined change in the trajectory of the object 308 in the one or more subsequent frames.

In accordance with an embodiment, the circuitry 202 may determine a first bounding box (such as the first bounding box 512) for the object 308 based on the position coordinates of the object 308. The circuitry 202 may determine a second bounding box (such as the second bounding box 510A) for the body part 306A of the first player 306 based on the position coordinates of the body part 306A of the first player 306. The circuitry 202 may determine whether a degree of overlap between the first bounding box 512 and the second bounding box 510A exceeds the overlap threshold. The circuitry 202 may detect the contact between the object 308 and the body part 306A of the first player 306 based on the determination that the degree of overlap exceeds the overlap threshold.

In accordance with an embodiment, the circuitry 202 may determine a distance between a starting point of the movement of the object 308 and the first player 306 based on the first bounding box 512 of the object 308 and the second bounding box 510A of the body part 306A of the first player 306. The circuitry 202 may determine the detected contact is intentional based on the distance between the starting point of the movement of the object 308 and the first player 306.

In accordance with an embodiment, the circuitry 202 may estimate pose information (such as the skeleton information 516) of the first player 306 based on application of a pose estimation algorithm to the frame of interest 304. The circuitry 202 may determine an angle between a centerline of a body of the first player 306 and a horizontal plane (such as the ground) is less than a threshold angle based on the pose information. The circuitry 202 may detect whether the first player 306 fell in the frame of interest 304 based on the determination that the angle is less than the threshold angle. The circuitry 202 may determine the detected contact is unintentional based on the detection the first player 306 fell in the frame of interest 304.

In accordance with an embodiment, the circuitry 202 may determine a plurality of key points (such as the key points 514) for the body of the first player 306 based on the pose information. The circuitry 202 may determine whether the body part 306A is between a hip region of the first player 306 and the ground based on the plurality of key points. The circuitry 202 may detect whether the first player 306 fell in the frame of interest 304 based on the determination that the body part 306A is between the hip region of the first player 306 and the ground. The circuitry 202 may determine the detected contact is unintentional based on the detection the first player 306 fell in the frame of interest 304.

In accordance with an embodiment, the circuitry 202 may determine a width-to-height ratio of a bounding box (such as the bounding box 510) of the first player 306 based on the frame of interest 304 is greater than a threshold ratio. The circuitry 202 may detect whether the first player 306 fell in the frame of interest 304 based on the determination that the width-to-height ratio is greater than the threshold ratio. The circuitry 202 may determine the detected contact is unintentional based on the detection the first player 306 fell in the frame of interest 304.

In accordance with an embodiment, the circuitry 202 may identify a color of a clothing of the first player 306 in the frame of interest 304. The circuitry 202 may determine whether the first player 306 is a goalkeeper based on the color of the clothing of the first player 306. The circuitry 202 may convert the frame of interest 304 to a grey scale image. The circuitry 202 may determine line markings of a playing surface in the frame of interest 304 based on application of a transform on the grey scale image. The circuitry 202 may determine coordinates of a penalty area (such as the penalty area 310) of the playing surface based on the determined line markings. The circuitry 202 may determine whether the goalkeeper is within the penalty area 310 based on the coordinates of the penalty area 310 and coordinates of a feet of the goalkeeper. The circuitry 202 may determine the detected contact is unintentional based on the determination that the goalkeeper is within the penalty area 310.

In accordance with an embodiment, the circuitry 202 may determine a change in the trajectory of the movement of the object 308 in one or more previous frames of the plurality of frames 402 prior to the frame of interest 304. The circuitry 202 may determine a bounding box of a second player in the one or more previous frames based on the change in the trajectory of the movement of the object 308. The circuitry 202 may determine whether the bounding box 510 of the first player 306 in the frame of interest 304 is the same as the bounding box of the second player. The circuitry 202 may determine the first player 306 as a source of hit prior to the contact based on the determination the bounding box 510 of the first player 306 in the frame of interest 304 is the same as the bounding box of the second player. The circuitry 202 may determine the second player as the source of hit prior to the contact based on the determination that the bounding box 510 of the first player 306 in the frame of interest 304 is not the same as the bounding box of the second player. The circuitry 202 may determine, based on the determination the second player is the source of hit prior to the contact, a reaction time available for the first player 306 to react prior to the detected contact based on a frame rate of the video, the frame of interest 304, and the one or more previous frames prior to the frame of interest 304. The circuitry 202 may determine the detected contact is unintentional based on the reaction time that is less than a threshold time.

In accordance with an embodiment, the circuitry 202 may determine a plurality of key points (such as the key points 514) for the body of the first player 306 based on pose information of the first player 306. The circuitry 202 determine coordinates of each key point of the plurality of key points of the body part 306A of the first player 306 in the frame of interest 304. The circuitry 202 may determine whether y-axis coordinates of a first set of key points of the plurality of key points corresponding to the body part 306A of the first player 306 is greater than y-axis coordinates of a second set of key points of the plurality of key points corresponding to a shoulder of the first player 306. The circuitry 202 may determine that the detected contact is intentional based on the determination the y-axis coordinates of the first set of key points is greater than the y-axis coordinates of the second set of key points.

In accordance with an embodiment, the circuitry 202 may determine a plurality of key points (such as the key points 514) for the body of the first player 306 based on pose information of the first player 306. The circuitry 202 may determine an area of a polygon that joins a first set of key points of the plurality of key points of the body part 306A of the first player 306 and at least one key point of the plurality of key points corresponding to a hip region of the first player 306. The circuitry 202 may determine a ratio of the area of the polygon to an area of the bounding box 510 of the first player 306. The circuitry 202 may determine the detected contact is unintentional based on the ratio that is less than a threshold value.

In accordance with an embodiment, the circuitry 202 may identify, from one or more previous frames of the plurality of frames 402 prior to the frame of interest 304, a source of hit prior to the contact between the first player 306 and the object 308. The circuitry 202 may determine a plurality of key points (such as the key points 514) for a body of the first player 306 based on pose information of the first player 306. The circuitry 202 may be configured to track movement of the position coordinates of the object 308 and position coordinates of at least one first key point of the plurality of key points corresponding to a wrist of the first player 306 and at least one second key point of the plurality of key points corresponding to an elbow of the first player 306 across the one or more previous frames. The circuitry 202 may determine whether the tracked movement of the position coordinates of the center of the object 308 and the tracked movement of the position coordinates of the at least one first key point corresponding to the wrist of the first player 306 and the at least one second key point corresponding to the elbow of the first player 306 are in the same direction. The circuitry 202 may determine the detected contact is intentional based on the determination that the tracked movement of the position coordinates of the object 308 and the tracked movement of the coordinates of the at least one first key point and the at least one second key point are in the same direction.

In accordance with an embodiment, the circuitry 202 may determine a number of passes of the object 308 subsequent to the frame of interest 304 is less than a threshold number. The circuitry 202 may determine a point is scored in a case where the number of passes is less than the threshold number. The circuitry 202 may determine the detected contact is intentional based on the determination that the point is scored, and the number of passes is less than threshold number.

In accordance with an embodiment, the circuitry 202 may track a speed of the movement of the object 308 and a speed of the movement of the body part 306A of the first player 306 based on the plurality of frames 402. The circuitry 202 may determine the detected contact is intentional based on the speed of the object 308 and the speed of the body part 306A of the first player 306.

In accordance with an embodiment, the circuitry 202 may train the ML model 112 on one or more features to classify the detected contact as one of intentional or unintentional. The one or more features may comprise one or more body parts of the first player 306, a trajectory of the movement of the object 308, pose information of the first player 306, color of a clothing of the first player 306, one or more areas (such as the penalty area 310) of a playing surface associated with the first player 306, the movement of the first player 306, and rules of the sport associated with the first player 306.

The foregoing description of embodiments and examples has been presented for purposes of illustration and description. It is not intended to be exhaustive or limiting to the forms described. Numerous modifications are possible considering the above teachings. Some of those modifications have been discussed and others will be understood by those skilled in the art. The embodiments were chosen and described for illustration of various embodiments. The scope is not limited to the examples or embodiments set forth herein but can be employed in any number of applications and equivalent devices by those of ordinary skill in the art. Rather it is hereby intended the scope be defined by the claims appended hereto. Additionally, the features of various implementing embodiments may be combined to form further embodiments.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. An electronic device, comprising:
   circuitry configured to:
   receive a plurality of frames of a video from at least one imaging device, wherein the video comprises a first player and an object;
   track a movement of the object and a movement of a body part of the first player across the plurality of frames;
   determine a frame of interest of the plurality of frames in which a degree of overlap between position coordinates of the object and position coordinates of the body part of the first player exceeds an overlap threshold, wherein the determination of the frame of interest is based on the tracked movement;
   detect a contact between the object and the body part of the first player based on the determined frame of interest; and
   apply a machine learning model on the frame of interest and the tracked movement to determine whether the detected contact is intentional.

2. The electronic device according to claim 1, wherein the circuitry is further configured to:
   output a first notification based on the determination that the detected contact is intentional; and
   output a second notification based on the determination that the detected contact is unintentional.

3. The electronic device according to claim 1, wherein the circuitry is further configured to:
   determine a trajectory of the movement of the object in one or more previous frames of the plurality of frames prior to the frame of interest;
   predict, based on the trajectory of the movement, the position coordinates of the object in one or more subsequent frames of the plurality of frames subsequent to the frame of interest;
   determine a change in the trajectory of the object in the one or more subsequent frames, wherein the determination of the change in trajectory is based on a difference between the predicted position coordinates and actual coordinates of the object in the one or more subsequent frames that exceeds a threshold range; and
   detect the contact between the object and the body part of the first player based on the determined change in the trajectory of the object in the one or more subsequent frames.

4. The electronic device according to claim 1, wherein the circuitry is further configured to:
   determine a first bounding box for the object based on the position coordinates of the object;
   determine a second bounding box for the body part of the first player based on the position coordinates of the body part of the first player;

determine a degree of overlap between the first bounding box and the second bounding box exceeds the overlap threshold; and detect the contact between the object and the body part of the first player based on the determination that the degree of overlap exceeds the overlap threshold.

5. The electronic device according to claim 4, wherein the circuitry is further configured to:

determine a distance between a starting point of the movement of the object and the first player based on the first bounding box of the object and the second bounding box of the body part of the first player; and determine the detected contact is intentional based on the distance between the starting point of the movement of the object and the first player.

6. The electronic device according to claim 1, wherein the circuitry is further configured to:

estimate pose information of the first player based on application of a pose estimation algorithm to the frame of interest;

determine an angle between a centerline of a body of the first player and a horizontal plane is less than a threshold angle based on the pose information; and detect the first player fell in the frame of interest based on the determination that the angle is less than the threshold angle; and determine the detected contact is unintentional based on the detection the first player fell in the frame of interest.

7. The electronic device according to claim 6, wherein the circuitry is further configured to:

determine a plurality of key points for the body of the first player based on the pose information;

determine whether the body part is between a hip region of the first player and a ground based on the plurality of key points;

detect the first player fell in the frame of interest based on the determination that the body part is between the hip region of the first player and the ground; and determine the detected contact is unintentional based on the detection the first player fell in the frame of interest.

8. The electronic device according to claim 6, wherein the circuitry is further configured to:

determine a width-to-height ratio of a bounding box of the first player based on the frame of interest is greater than a threshold ratio;

detect the first player fell in the frame of interest based on the determination that the width-to-height ratio is greater than the threshold ratio; and determine the detected contact is unintentional based on the detection the first player fell in the frame of interest.

9. The electronic device according to claim 1, wherein the circuitry is further configured to:

identify a color of a clothing of the first player in the frame of interest; and determine whether the first player is a goalkeeper based on the color of the clothing of the first player.

10. The electronic device according to claim 9, wherein the circuitry is further configured to:

convert the frame of interest to a grey scale image;

determine line markings of a playing surface in the frame of interest based on application of a transform on the grey scale image;

determine coordinates of a penalty area of the playing surface based on the determined line markings;

determine the goalkeeper is within the penalty area based on the coordinates of the penalty area and coordinates of a feet of the goalkeeper; and determine the detected contact is unintentional based on the determination that the goalkeeper is within the penalty area.

11. The electronic device according to claim 1, wherein the circuitry is further configured to:

determine a change in the trajectory of the movement of the object in one or more previous frames of the plurality of frames prior to the frame of interest;

determine a bounding box of a second player in the one or more previous frames based on the change in the trajectory of the movement of the object;

determine a bounding box of the first player in the frame of interest is the same as the bounding box of the second player; and determine the first player as a source of hit prior to the contact based on the determination the bounding box of the first player in the frame of interest is the same as the bounding box of the second player.

12. The electronic device according to claim 11, wherein the circuitry is further configured to:

determine the second player as the source of hit prior to the contact based on the determination that the bounding box of the first player in the frame of interest is not the same as the bounding box of the second player;

determine, based on the determination the second player is the source of hit prior to the contact, a reaction time available for the first player to react prior to the detected contact based on a frame rate of the video, the frame of interest, and the one or more previous frames; and determine the detected contact is unintentional based on the reaction time is less than a threshold time.

13. The electronic device according to claim 1, wherein the circuitry is further configured to:

determine a plurality of key points for a body of the first player based on pose information of the first player;

determine coordinates of each key point of the plurality of key points of the body part of the first player in the frame of interest;

determine y-axis coordinates of a first set of key points of the plurality of key points corresponding to the body part of the first player is greater than y-axis coordinates of a second set of key points of the plurality of key points corresponding to a shoulder of the first player; and determine the detected contact is intentional based on the determination the y-axis coordinates of the first set of key points is greater than the y-axis coordinates of the second set of key points.

14. The electronic device according to claim 1, wherein the circuitry is further configured to:

determine a plurality of key points for a body of the first player based on pose information of the first player;

determine an area of a polygon that joins a first set of key points of the plurality of key points of the body part of the first player and at least one key point of the plurality of key points corresponding to a hip region of the first player;

determine a ratio of the area of the polygon to an area of a bounding box of the first player; and determine the detected contact is unintentional based on the ratio is less than a threshold value.

15. The electronic device according to claim 1, wherein the circuitry is further configured to:

identify, from one or more previous frames of the plurality of frames prior to the frame of interest, a source of hit prior to the contact;

determine a plurality of key points for a body of the first player based on pose information of the first player in the one or more previous frames;

track movement of the position coordinates of the object and position coordinates of at least one first key point of the plurality of key points corresponding to a wrist of the first player and at least one second key point of the plurality of key points corresponding to an elbow of the first player across the one or more previous frames;

determine whether the tracked movement of the position coordinates of the object and the tracked movement of the position coordinates of the at least one first key point and the at least one second key point are in the same direction; and determine the detected contact is intentional based on the determination that the tracked movement of the position coordinates of the object and the tracked movement of the position coordinates of the at least one first key point and the at least one second key point are in the same direction.

16. The electronic device according to claim 1, wherein the circuitry is further configured to:

determine a number of passes of the object subsequent to the frame of interest is less than a threshold number;

determine a point is scored in a case where the number of passes is less than the threshold number; and determine the detected contact is intentional based on the determination that the point is scored, and the number of passes is less than threshold number.

17. The electronic device according to claim 1, wherein the circuitry is further configured to:

track a speed of the movement of the object and a speed of the movement of the body part of the first player based on the plurality of frames; and determine the detected contact is intentional based on the speed of the object and the speed of the body part of the first player.

18. The electronic device according to claim 1, wherein the circuitry is further configured to:

train the machine learning model on one or more features to classify the detected contact as one of intentional or unintentional, and the one or more features comprise one or more body parts of the first player, a trajectory of the movement of the object, pose information of the first player, color of a clothing of the first player, one or more areas of a playing surface associated with the first player, the movement of the first player, and rules of a sport associated with the first player.

19. A method, comprising:

in an electronic device:

receiving a plurality of frames of a video from at least one imaging device, wherein the video comprises a first player and an object;

tracking a movement of the object and a movement of a body part of the first player across the plurality of frames;

determining a frame of interest of the plurality of frames in which a degree of overlap between position coordinates of the object and position coordinates of the body part of the first player exceeds an overlap threshold, wherein the determination of the frame of interest is based on the tracked movement;

detecting a contact between the object and the body part of the first player based on the determined frame of interest; and applying a machine learning model on the frame of interest and the tracked movement to determine whether the detected contact is intentional.

20. A non-transitory computer-readable medium having stored thereon, computer-executable instructions which, when executed by a processor of an electronic device, cause the processor to execute operations, the operations comprising:

receiving a plurality of frames of a video from at least one imaging device, wherein the video comprises a first player and an object;

tracking a movement of the object and a movement of a body part of the first player across the plurality of frames;

determining a frame of interest of the plurality of frames in which a degree of overlap between position coordinates of the object and position coordinates of the body part of the first player exceeds an overlap threshold, wherein the determination of the frame of interest is based on the tracked movement;

detecting a contact between the object and the body part of the first player based on the determined frame of interest; and applying a machine learning model on the frame of interest and the tracked movement to determine whether the detected contact is intentional.

* * * * *